United States Patent [19]
Dahl

[11] Patent Number: 5,247,694
[45] Date of Patent: Sep. 21, 1993

[54] SYSTEM AND METHOD FOR GENERATING COMMUNICATIONS ARRANGEMENTS FOR ROUTING DATA IN A MASSIVELY PARALLEL PROCESSING SYSTEM

[75] Inventor: E. Denning Dahl, Malden, Mass.

[73] Assignee: Thinking Machines Corporation, Cambridge, Mass.

[21] Appl. No.: 538,184

[22] Filed: Jun. 14, 1990

[51] Int. Cl.[5] .............................................. G06F 15/16
[52] U.S. Cl. ................................. 395/800; 364/230; 364/229.4; 364/284.3; 364/284; 364/DIG. 1
[58] Field of Search ......................... 395/800, 500, 650

[56] References Cited

U.S. PATENT DOCUMENTS

| | | | |
|---|---|---|---|
| 4,247,892 | 1/1981 | Lawrence | 395/200 |
| 4,380,046 | 4/1983 | Fung | 395/800 |
| 4,435,758 | 3/1984 | Lorie et al. | 395/800 |
| 4,621,339 | 11/1986 | Wagner et al. | 395/800 |
| 4,730,322 | 3/1988 | Pollara-Bozzola | 371/43 |
| 4,814,980 | 3/1989 | Peterson | 364/200 |
| 4,920,487 | 4/1990 | Baffes | 395/650 |
| 4,922,413 | 5/1990 | Stoughton | 395/800 |
| 4,933,933 | 6/1990 | Dally | 370/60 |
| 4,972,314 | 11/1990 | Getzinger et al. | 395/425 |

OTHER PUBLICATIONS

Mapping of Compiled Communication on the Connection Machine System by E. Denning Dahl.
Kirkpatrick, S., et al., "Optimization By Simulated Annealing", Science, vol. 220, No. 4598 (May 13, 1983) pp. 671-680.
Tamboulian, S., "A System For Routing Arbitrary Communications Graphs On SIMD Architectures", PhD. Thesis, 1986.
Banerjee, "Parallel Simulated Annealing Algorithms For Cell Placement on Hypercube Multiprocessors", IEEE Trans. Par. & Dist. Systems. vol. 1, No. 1 (Jan. 1990, pp. 91-106).

Primary Examiner—Thomas C. Lee
Assistant Examiner—Eric Coleman
Attorney, Agent, or Firm—Richard A. Jordan

[57] ABSTRACT

A system for generating communication pattern information for facilitating communication among processing nodes interconnected over communications links in a predetermined pattern to form a massively parallel processor. The system includes a mapping element and a communication pattern information generating element. The mapping element maps problem vertices from a problem graph onto processing nodes of a massively-parallel processor in relation to a communication cost function representing delays associated with communicating among processing nodes to which the respective problem vertices have been mapped. The communication pattern information generating element generates communication pattern information in connection with problem vertices mapped onto processing nodes, for use in directing message transfers among processing nodes to facilitate transfers of messages among the processing nodes over the communications links as defined by the problem graph.

73 Claims, 16 Drawing Sheets (A) FIG. 5A

156 — HOST ENABLES PROCESSING NODES TO GENERATE RANDOM COM LINK POINTER FOR EACH TOKEN IDENTIFYING A PROSPECTIVE TOKEN TRANSFER

157 — HOST ENABLES PROCESSING NODES TO DETERMINE, FOR NEXT TOKEN IN TOKEN LIST, A COM COST CHANGE VALUE IN RESPONSE TO PROSPECTIVE TOKEN TRANSFER

160 — HOST ENABLES PROCESSING NODES TO GENERATE MESSAGES FOR TRANSMISSION TO PROCESSING NODES IDENTIFIED AS RENDEZVOUS NODES FOR COMMUNICATION LINK ASSOCIATED WITH PROSPECTIVE VERTEX REASSIGNMENT, MESSAGES INCLUDING MESSAGE ID AND COM COST CHANGE VALUE

161 — HOST ENABLES PROCESSING NODES, OPERATING AS RENDEZVOUS NODES TO DETERMINE WHETHER IT RECEIVED MESSAGES FOR PROSPECTIVE VERTEX REASSIGNMENTS FROM PROCESSING NODES AT BOTH ENDS OF ASSOCIATED COMMUNICATIONS LINKS (B) FIG. 5C

FIG. 5B

 FIG. 5B

162 HOST ENABLES PROCESSING NODES, OPERATING AS RENDEZVOUS NODES, THAT RECEIVED NECESSARY MESSAGES TO SELECT ONE MESSAGE FROM PROCESSING NODE AT EACH END OF COMMUNICATIONS LINK

163 HOST ENABLES PROCESSING NODES, OPERATING AS RENDEZVOUS NODES, TO DETERMINE A CONSOLIDATED COM COST CHANGE VALUE USING SELECTED MESSAGES

164 HOST ENABLES PROCESSING NODES, OPERATING AS RENDEZVOUS NODES, TO GENERATE THRESHOLD VALUES AND TO PERFORM A COMPARISON BETWEEN THE RESPECTIVE THRESHOLD VALUES AND COM COST CHANGE VALUES

165 HOST ENABLES PROCESSING NODES, OPERATING AS RENDEZVOUS NODES, WHOSE CONSOLIDATED COM COST CHANGE VALUES ARE LESS THAN THE THRESHOLD VALUE, TO SET THEIR CONTEXT FLAGS

166 HOST ENABLES PROCESSING NODES, OPERATING AS RENDEZVOUS NODES, WITH SET CONTEXT FLAGS TO GENERATE VERTEX REASSIGNMENT ENABLE MESSAGES FOR TRANSFER TO PROCESSING NODES FROM WHICH THEY RECEIVED SELECTED PROSPECTIVE VERTEX REASSIGNMENT MESSAGES

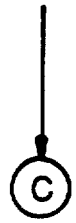 FIG. 5D

FIG. 5C

 FIG. 5D-1

171 HOST ENABLES PROCESSING NODES WITH SET CONTEXT FLAGS TO GENERATE MESSAGES FOR TRANSMISSION TO PROCESSING NODES WITH PROBLEM VERTEX TOKENS FOR UPSTREAM AND DOWNSTREAM PROBLEM VERTICES, USING IDENTIFIED PROBLEM VERTEX TOKEN, THE MESSAGES IDENTIFYING THE TOKENS TO BE TRANSFERRED AND THE COM LINK

172 HOST ENABLES PROCESSING NODES TO TRANSFER GENERATED MESSAGES

173 HOST ENABLES RECEIVING PROCESSING NODES TO UPDATE POINTERS OF THEIR PROBLEM VERTEX TOKENS IN RESPONSE TO RECEIVED MESSAGES

174 HOST ENABLES PROCESSING NODES WITH SET CONTEXT FLAGS TO UPDATE POINTERS OF IDENTIFIED PROBLEM VERTEX TOKENS TO REFLECT COMMUNICATIONS LINKS OVER WHICH THEY WILL BE TRANSFERRED

 FIG. 5D-1

213    HOST ENABLES PROCESSING NODES TO TRANSFER
MSG TOKENS ASSIGNED TO COMMUNICATIONS LINKS
OVER THE ASSIGNED COMMUNICATIONS LINKS TO
RECEIVING PROCESSING NODES

Ⓓ FIG. 6A

SYSTEM AND METHOD FOR GENERATING COMMUNICATIONS ARRANGEMENTS FOR ROUTING DATA IN A MASSIVELY PARALLEL PROCESSING SYSTEM

INCORPORATION BY REFERENCE

U.S. Pat. No. 4,598,400, issued Jul. 1, 1986, to W. Daniel Hillis, for Method and Apparatus For Routing Message Packets, and assigned to the assignee of the present application, incorporated herein by reference.

U.S. Pat. No. 4,814,973, issued Mar. 21, 1989, to W. Daniel Hillis, for Parallel Processor, and assigned to the assignee of the present application, incorporated herein by reference.

U.S. patent application Ser. No. 07/043,126 now U.S. Pat. No. 4,984,235, filed Apr. 27, 1987, by W. Daniel Hillis, et al, for Method and Apparatus For Routing Message Packets, and assigned to the assignee of the present application, incorporated herein by reference.

U.S. patent application Ser. No. 07/179,020, filed Apr. 8, 1988 now abandoned, by Brewster Kahle, et al., for Method and Apparatus For Interfacing Parallel Processors To A Co-Processor, and assigned to the assignee of the present application, incorporated herein by reference.

E. Denning Dahl, "Mapping And Compiled Communication On the Connection Machine System," an unpublished paper by the inventor attached hereto as an Appendix, incorporated herein by reference.

FIELD OF THE INVENTION

The invention relates generally to the field of massively parallel computer systems, and more particularly to communications arrangements for transferring data among processing nodes in such systems.

In brief summary, the invention provides a system for generating communication pattern information for facilitating communication among processing nodes interconnected over communications links in a predetermined pattern to form a massively parallel processor. The system includes a mapping element and a communication pattern information generating element. The mapping element maps problem vertices from a problem graph onto processing nodes of a massively-parallel processor in relation to a communication cost function representing delays associated with communicating among processing nodes to which the respective problem vertices have been mapped. The communication pattern information generating element generates communication pattern information in connection with problem vertices mapped onto processing nodes, for use in directing message transfers among processing nodes to facilitate transfers of messages among the processing nodes over the communications links as defined by the problem graph.

BACKGROUND OF THE INVENTION

A computer system generally includes one or more processors, a memory and an input/output system. The memory stores data and instructions for processing the data. The processor(s) process the data in accordance with the instructions, and store the processed data in the memory. The input/output system facilitates loading of data and instructions into the system, and obtaining processed data from the system.

Most modern computer systems have been designed around a "von Neumann" paradigm, under which each processor has a program counter that identifies the location in the memory which contains its (the processor's) next instruction. During execution of an instruction, the processor increments the program counter to identify the location of the next instruction to be processed. Processors in such a system may share data and instructions; however, to avoid interfering with each other in an undesirable manner, such systems are typically configured so that the processors process separate instruction streams, that is, separate series of instructions, and sometimes complex procedures are provided to ensure that processors' access to the data is orderly.

In Von Neumann machines instructions in one instruction stream are used to process data in a single data stream. Such machines are typically referred to as SISD (single instruction/single data) machines if they have one processor, or MIMD (multiple instruction/multiple data) machines if they have multiple processors. In a number of types of computations, such as processing of arrays of data, the same instruction stream may be used to process data in a number of data streams. For these computations, SISD machines would iteratively perform the same operation or series of operations on the data in each data stream. Recently, single instruction/multiple data (SIMD) machines have been developed which process the data in all of the data streams in parallel. Since SIMD machine process all of the data streams in parallel, such problems can be processed much more quickly than in SISD machines, and at lower cost than with MIMD machines providing the same degree of parallelism.

The aforementioned Hillis patents and Hillis, et al., patent application disclose an SIMD machine which includes a host computer, a micro-controller and an array of processing elements, each including a bit-serial processor and a memory. The host computer, inter alia, generates commands which are transmitted to the micro-controller. In response to a command, the micro-controller transmits one or more SIMD instructions to the array, each SIMD instruction enabling all of the processing elements to perform the same operation in connection with data stored in the elements' memories.

The array disclosed in the Hillis patents and Hillis, et al., patent application also includes two communications mechanisms which facilitate transfer of data among the processing elements. One mechanism enables all of the processing elements to, in parallel, transmit data to a selected one of its nearest-neighbor processing elements, in a regular array pattern. The second mechanism, a global router interconnecting integrated circuit chips housing the processing elements in a hypercube, enables any processing element to transmit data to any other processing element in the system. In the first mechanism, termed "NEWS", the processing elements are organized in a array, and the micro-controller enables all of the processing elements to transmit bit serial data in unison in a selected direction along one of the dimensions, and to receive, in unison, bit serial data from the processing element in the other direction along the same dimension.

On the other hand, in the global router, the data is transmitted in the form of messages, with each message containing an address that identifies the processing element to receive the data. The micro-controller enables the processing elements to transmit messages, in bit serial format, through the global router in unison, and controls the timing of the global router, but it does not control the destination of the message, as it does in the NEWS mechanism. However, the address, and other message protocol information that may be transmitted in each message, as well as the time required to interpret the address in each message to route the message to its destination, represent overhead that reduces the rate at which data can be transmitted.

SUMMARY OF THE INVENTION

The invention provides a system for generating communications arrangements for facilitating transfers of data among processing nodes in a processor array.

In brief summary, the invention provides a system for generating communication pattern information for facilitating communication among processing nodes interconnected over communications links in a predetermined pattern to form a massively parallel processor. The system includes a mapping element and a communication pattern information generating element. The mapping element maps problem vertices from a problem graph onto processing nodes of a massively-parallel processor in relation to a communication cost function representing delays associated with communicating among processing nodes to which the respective problem vertices have been mapped. The communication pattern information generating element generates communication pattern information in connection with problem vertices mapped onto processing nodes, for use in directing message transfers among processing nodes to facilitate transfers of messages among the processing nodes over the communications links as defined by the problem graph.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 1, 2, 3A, 3B, 4A, 4B and 4C are block diagrams, flow diagrams and diagrams of data structures that are helpful in understanding the operation of a system constructed in accordance with the invention;

FIGS. 5A, 5B, 5C, 5D-1, 5D-2, 6A, 6B and 6C are flow diagrams depicting the operations performed by a system constructed in accordance with the invention.

DETAILED DESCRIPTION OF AN ILLUSTRATIVE EMBODIMENT

1. Introduction

The invention provides a communication arrangement generating system for improving communications in a massively parallel processor, such as that described in the aforementioned Hillis patents and Hillis, et al., patent application. Before describing the inventive system, it would be helpful to describe types of problems for which the system is most useful, and also to describe a massively parallel processor for which the system may improve communications.

The system in accordance with the invention is most useful in connection with processing of problems, such as finite element analysis, fluid flow analysis, electronic circuit simulation, and simulated neural networks, in which the problem can be defined in terms of a fixed pattern of array elements, and in which a communication graph defined for communication between the array elements is irregular but fixed and known ab initio.

For example, in fluid flow analysis, the array elements may represent fixed points in space, and the analysis may provide information as to the direction and velocity of the flow of the fluid at successive increments in time. As the analysis proceeds through successive increments in time, the results of processing at upstream points in space are used in processing for downstream points; the downstream points are effectively "dependent" on the upstream points. To enable processing at successive points in time, the results generated for each point in space are used in processing the downstream points in space. The communication graph for such an analysis represents this pattern between points in space, effectively showing the dependencies among the points for the flow analysis.

Similarly, in simulation of electronic circuits, the array elements may represent the elements in the circuit to be simulated, and the simulation may provide such circuit characteristics as, for example, the voltage and current at the output terminal(s) of the circuit elements at successive points in time. As the analysis proceeds through successive points in time, the results of processing for each of the circuit elements are provided for processing of the downstream circuit elements, that is, the circuit elements connected to the output terminal(s) of each of the circuit elements; the downstream circuit elements are effectively "dependent" upon the upstream circuit elements. To enable processing at successive points in time, the results generated for each circuit element are provided to facilitate the processing of downstream circuit elements. The communication graph for such an analysis represents this pattern between points in the circuit, effectively showing the dependencies among the circuit elements for the simulation.

Figure 1B:
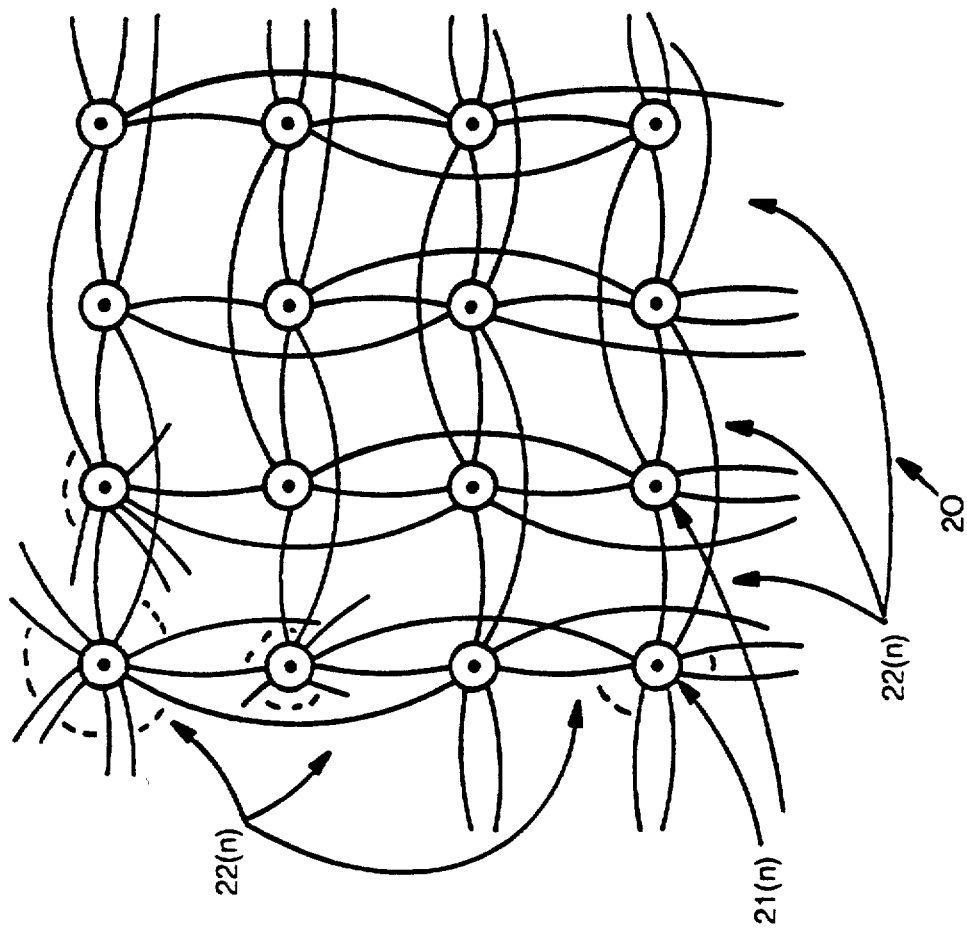
Figure 1A:
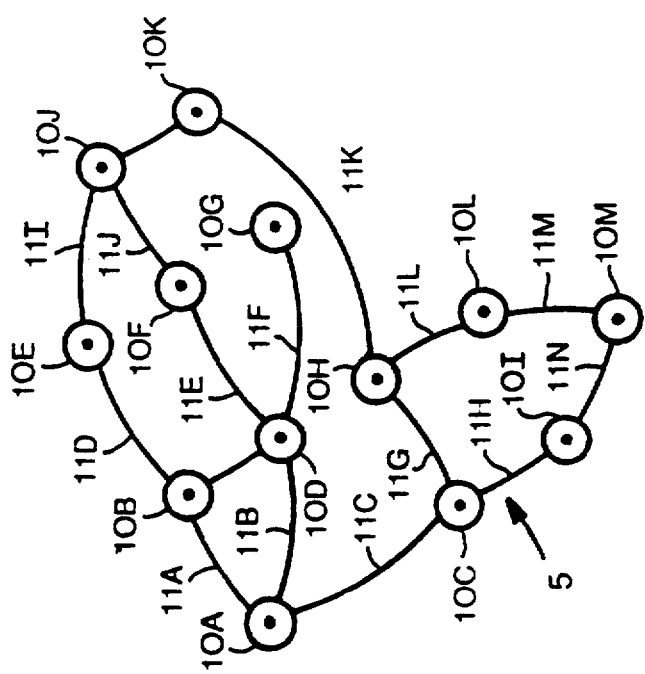

FIG. 1A depicts a problem graph 5 comprising a plurality of problem vertices 10A through 10 [generally identified by reference numeral 10(i)], interconnected by edges 11A through 11M [generally identified by reference numeral 11(j)]. Each problem vertex 10(i) represents a point in an array that is to be processed during processing by the massively parallel processor. For example, in the fluid flow example, each problem vertex 10(i) represents each point in space. Similarly, in the electronic circuit simulation example, each problem vertex 10(i) represents each circuit element.

Each edge 11(j) between two problem vertices 10(i) represents the dependencies between the array points represented by the problem vertices 10(i). Effectively, the edges 11(j) represent communication of data between the elements of the array to be processed. For example, in a fluid flow analysis, in which the problem vertices 10(i) represent points in space, the edges 11(j) represent the pattern of communication of data between the upstream and downstream points in space necessary to permit determination of the fluid flow characteristics at the successive points in time. Similarly, in the simulation of an electronic circuit, the edges 11(u) represent the communication pattern between the respective circuit elements to permit determination of the required electrical characteristics at the successive points in time.

To effect such processing on a massively parallel processor, such as described in the aforementioned Hillis patents and Hillis, et al., patent application, the diverse elements of the problem graph 5 are associated with various processing elements of the processor array; the elements of the problem graph 5 are said to be "mapped" onto the processor array. The processor array is represented by an array 20 (FIG. 1B), comprising a plurality of processing elements 21A through 21Q [generally identified by reference numeral 21(m)] interconnected by communications links generally identified by reference numeral 22(n). In the massively parallel processor described in the Hillis patents and Hillis, et al., patent application, the communications links 22(n) are in the form of a hypercube.

The communication arrangement generating system provides a mapping of the problem vertices 10(i) to various ones of the processing elements 21(m) of the processor array, to facilitate efficient communications over the communications links 22(n) and rapid processing by the processor array. In some cases, the problem vertices 10(i) connected by an edge 11(j) can be mapped to adjacent processing elements 21(m), that is, those connected by a communications link 22(n). However, in many cases the problem vertices 10(i) are associated with processing elements 22(m) that are not adjacent, so that the respective edge 11(j) connected to them will be represented by several communications links 22(n) and intermediate processing elements 21(m). The system provides tables that are used at each processing element 21(m) to effect communications among the processing elements 21(m), the table at each processing element including entries that effectively associate each item of data with particular ones of the communications links 22(m) in one or more message transfer cycles, to enable the data to be transferred among successive processing elements 21(m) to effect the dependencies.

Before proceeding further, it would be helpful to further describe the processor array for which one embodiment of the inventive system is used.

Figure 2:
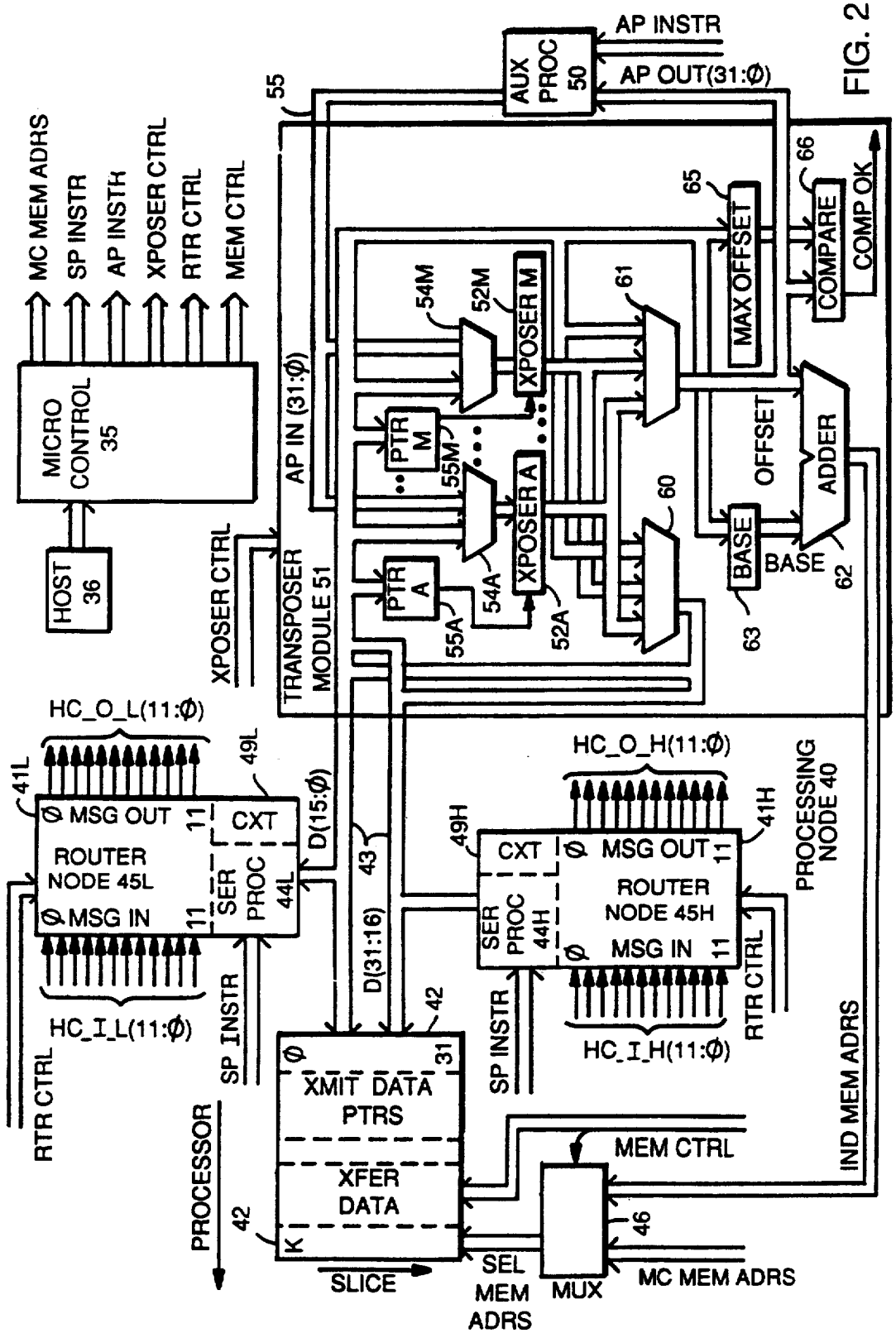

The computer system includes a micro-controller 35, which is controlled by a host 36 and which, in turn, controls an array of processing nodes, one of which, namely, processing node 40, is shown in FIG. 2. To accomplish processing, the host computer 36 transmits commands to the micro-controller 35. In response to a command, the micro-controller 35 may transmit one or more instructions or other sets of control signals which control processing and other operations, in parallel, to all of the processing nodes concurrently. In addition, a number of processing nodes 40 are interconnected, as described in the aforementioned Hillis patents and Hillis, et al., patent application to facilitate the transfer of data among the processing nodes 21(m).

With reference to FIG. 2, processing node 40 includes two processing element (PE) chips 41H and 41L (generally identified by reference numeral 41) connected to a memory 42 over a data bus 43. In one embodiment, the data bus includes thirty-two data lines D(31:0) which are divided into high-order data lines D(31:16), which connect to PE chip 41H, and low-order data lines D(45:0), which connect to PE chip 41L.

Each PE chip 41 includes a set of serial processors, generally identified by reference numeral 44, and a router node, generally identified by reference numeral 45. The serial processors operate in response to SP INSTR serial processor instruction signals from the micro-controller 35 to perform processing on data stored in the memory 42. Each serial processor 44 has an associated context flag, generally identified by reference numeral 49, whose condition determines whether the serial processor 44 will perform the operation enabled by the SP INSTR serial processor instruction signals; that is, processing by a serial processor 44 is conditioned on the condition of the associated context flag 49. The condition of each context flag 49 can be established by previous processing by, for example, the associated serial processor 44.

The micro-controller 5 may enable the serial processors 14(i) to emulate a larger number of virtual processors by essentially providing, in each memory 12, multiple sets of each item of data, one set associated with each virtual processor. In that case, the micro-controller 5 provides the SP INSTR serial processor instruction signals multiple times to, in parallel, enable the serial processors 14(i) to process the sets seriatim. The serial processors 14(i) may also maintain context flags associated with each virtual processor emulated thereby to condition processing of the particular data set.

The memory 42 operates in response to SEL MEM ADRS selected memory address signals, which identify storage locations in the memory 42, and MEM CTRL memory control signals which indicate whether data is to be stored in or transmitted from the location identified by the SEL MEM ADRS selected memory address signals. The SEL MEM ADRS selected memory address signals are provided by a multiplexer 46, which operates under control of the MEM CTRL memory control signals from the micro-controller 35. The multiplexer 46 couples either MC MEM ADRS micro-controller memory address signals from the micro-controller 35 or IND MEM ADRS indirect memory address signals to the memory 42 as the SEL MEM ADRS selected memory address signals. The router nodes 45 also operate in response to RTR CTRL router control signals, also from the micro-controller 35, to transmit messages containing data from one processing node 40 to another.

In one embodiment, each PE chip 41 includes sixteen serial processors 44, each of which is associated with one of the data lines of the data bus 43. That is, each serial processor 44(i) receives data bits from, and transmits data bits onto, one of the data lines D(i) ["i" is an integer from the set (31, . . . , 0)]. The memory 42 has storage locations organized into thirty-two bit slices, with each slice being identified by a particular binary-encoded value of the SEL MEM ADRS selected memory address signals from the multiplexer 46. If data is to be transmitted from a slice in memory identified by a particular value of the SEL MEM ADRS selected memory address signals, the memory 42 will transmit bits 61 through 0 of the slice onto data lines D(31) through D(0), respectively. On the other hand, if data is to be loaded into a slice in memory identified by a particular value of the SEL MEM ADRS selected memory address signals, the memory 42 will receive bits 61 through 0 of from data lines D(31) through D(0), respectively, and load them into respective bits of the slice.

To perform processing on multi-bit words of data in the memory 42 using the serial processors 44, the micro-controller 35 iteratively enables generation of SEL MEM ADRS selected memory address signals whose values identify successive location in memory 42, and MEM CTRL memory control signals which enable the memory 42 to transmit or store slices of data, and SP INSTR serial processor instruction signals which enable the serial processors 44 to perform the required operations on the bits on their associated data lines D(i). The data in the memory 42 thus may be viewed in two ways, namely, (i) a slice view, identified by the arrow labeled "SLICE," representing fixed-size words of data ("data slices") that will be transmitted from the memory 42 onto the data bus 43, or that will be received by the memory 42 from the data bus 43, at one time in response to the MEM ADRS memory address signals, and (ii) a processor view, identified by the arrow labelled "PROCESSOR," which represents the organization in memory 42 of data which may be accessed by an individual serial processor. Each serial processor 44(i) and the associated portion of memory 42 comprises one of the aforementioned processing elements 21(m) (FIG. 2).

The router nodes 45 of all of the processing nodes 40 are interconnected to facilitate transfer of messages among the processing nodes 40 comprising the array. Each message includes an address to identify a processing node 40 and serial processor 44(i) that is the intended recipient of the message, and data. In one particular embodiment the router nodes are interconnected in the form of a hypercube, as described in the aforementioned Hillis patents. Each router node 45H and 45L, under control of RTR CTRL router counter signals from the micro-controller 35, transmits messages to other router nodes 45 on other processing element chips 41 over a plurality of communications links identified by reference numerals HC_O_H(11:0) and HC_O_L(11:0), respectively.

In addition, each router node 45H and 45L receives messages from communications links identified by reference numerals HC_I_H(11:0) and HC_I_L(11:0), respectively. The router nodes 45 determine from the address of each received message whether the message is intended for a serial processor 44(i) on the processing node 40 and, if so, couples it onto a data line D(i) of data bus 43 over which the serial processor 44(i) that is to receive the message accesses the memory 42. The micro-controller 35 enables generation of SEL MEM ADRS selected memory address and MEM CTRL memory control signals to facilitate the storage of the data from the message in the memory 42.

The various communications links HC_O_H(11:0), HC_O_L(11:0), HC_I_H(11:0) and HC_I_L(11:0) connected to each processing node 40 are connected to diverse ones of other processing nodes in a conventional manner to effect the hypercube interconnection. Thus, the outgoing communications links identified by reference numerals HC_O_H(11:0) and HC_O_L(11:0) correspond to various incoming communications links, which may be identified by reference numerals HC_I_H(11:0) and HC_I_L(11:0), at router nodes 45 of other processing nodes 40. In one embodiment, the circuitry of the router nodes 45H and 45L is similar to that described in the aforementioned Hillis patents and Hillis, et al. patent application and will not be described further herein.

The router nodes 45, under control of the micro-controller 35, perform message transfers in one or more message transfer cycles. That is, one message transfer operation, which may be initiated in response to a single message transfer command from the host 36, may require multiple message transfer cycles to complete. In each message transfer cycle, each processing node 40 may transfer a message over each communications link connected thereto to another processing node 40. For each message so transferred, if the destination serial processor 44(i) is located on the receiving processing node 40, the router node 45 that receives the message will deliver the data in the message thereto. That is, the router node 45 couples the data onto the data line D(i) associated with the destination serial processor and stores it, in processor format in memory 42.

On the other hand, if the destination serial processor 44(i) is not located on the receiving processing node 40, that processing node 40, during a subsequent message transfer cycle, transfers the message, over a communications link connected thereto, to another processing node 40. Eventually, all of the messages transferred during the message transfer operation reach their respective destination serial processor(s), at which point the message transfer operation is finished. During each message transfer cycle, the micro-controller 35 identifies the same location in memory 42 in which the ejected message(s) are to be stored. Accordingly, it will be appreciated that, in the systems described in the aforementioned Hillis patents and Hillis, et al., patent application, if multiple messages have the same destination serial processor 44(i), unless the router nodes 40 perform combining operations as described in the Hillis, et al., patent application, only one message can be delivered for that serial processor during a message transfer cycle, with successive messages being delivered during subsequent message transfer cycles.

The processing nodes 40 may also have an auxiliary processor 50 that processes data in memory 42 that may be organized either in slice format or in processor format, and a transposer module 51 to interface the auxiliary processor 50 to the data bus 43. The auxiliary processor 50 may be, for example, a floating point processor, which may perform arithmetic and logic operations in connection with data in floating point data format. The auxiliary processors 50 and transposer modules 51 in the various processing nodes 40 operate in response to AP INSTR auxiliary processor instruction signals and XPOSER CTRL transposer control signals, respectively, from the micro-controller 35. As is the case with the other control signals provided by the micro-controller 35, the micro-controller 35 transmits the AP INSTR auxiliary processor instruction signals and the XPOSER CTRL transposer control signals to control the auxiliary processor 50 and transposer module 51 of all of the processing nodes 40 concurrently, enabling them to generally perform the same operation concurrently.

The transposer module 51 includes several transposer circuits 52A through 52M (generally identified by reference numeral 52). Each transposer 52 receives input data from an input multiplexer 54 and stores it in one of a plurality of slots identified by the contents of a write pointer register 55. The register 55 may be provided with a pointer prior to storing each item of data in a slot in the associated transposer 52. Alternatively, the register may be loaded with an initial value before loading any data in the associated transposer 52 and then incremented for each successive item of data loaded therein. The input multiplexer 54, under control of the XPOSER CTRL transposer control signals, selectively couples data signals to the transposer 52 from either the data bus 43 or from a bus 56. Bus 56 carries AP IN (61:0) auxiliary processor in signals representing processed data from the auxiliary processor 50.

The transposers 52 operate in response to the XPOSER CTRL transposer control signals to generate transpositions of the data stored therein. The transposer module 51 also includes two output multiplexers 60 and 61, also controlled by the XPOSER CTRL transposer control signals, which control the transfer of transposed data onto a bus 62 for transmission to the auxiliary processor 50 or onto the data bus 43 for transmission to the memory 42 or to the PE chips 41. Multiplexer 60 receives data signals from the output terminals of transposers 52 and selectively couples the signals from one of the transposers onto the data bus 43. Similarly, the multiplexer 61 receives data signals from the output terminals of transposers 52 and selectively couples the signals from one of the transposers onto the bus 62 for transmission to the auxiliary processor. The structure and operation of transposers 52, input multiplexers 54, pointer registers 55 and output multiplexers 60 and 61 are generally described in the aforementioned Kahle, et al., patent application.

The processing node 40 also provides a direct (that is, non-transposing) path between the data bus 43 and the auxiliary processor 50. It will be appreciated that the transposer module 51 facilitates the transposition of data transmitted from the memory 42 in processor format, which would be transmitted serially over separate lines of the data bus 43, into parallel format for processing by the auxiliary processor 50. If the data is stored in memory 42 in slice format, transposition is not required. In addition, the transposer module 51 receives processed data from the auxiliary processor 50 and, if it is required that it be stored in the memory 42 in processor format, transposes the data for transmission serially over predetermined lines of the data bus 43. If the processed data from the auxiliary processor 50 is to be stored in the memory 42 in slice format, the data may be transmitted by the auxiliary processor 50 to the memory 42 over the non-transposing path.

The transposer module 51 also includes several components which provide the IND MEM ADRS indirect memory address signals which are coupled to the multiplexer 46. This indirect memory addressing capability permits the processing nodes 40 to provide locally-determined memory addresses to their own memories 42, so that the addressed locations in the respective memories 42 may differ as among the various processing nodes 40. The transposer module 51 includes an adder 62 which produces the IND MEM ADRS indirect memory address signals in response to BASE signals provided from a base register 63 and OFFSET signals from multiplexer 61. Thus, the OFFSET signals may correspond to the outputs of one of the transposers 52 or the signals on the data bus 43. The base register 63 and maximum offset register 65 are separately provided with values provided over bus 43 in response to appropriate XPOSER CTRL transposer control signals from the micro-controller 35.

The compare circuit 66 determines whether the binary-encoded value of the signals from multiplexer 61 exceeds the binary-encoded value of the MAX OFFSET signals from the register 65, to provide a COMP OK compare status signal to indicate whether the offset provided by the OFFSET signals is less than the maximum offset identified by the maximum offset register 65. If the COMP OK compare status signal indicates that the value of the OFFSET signal exceeds the maximum offset value contained in the maximum offset register 65, the micro-controller 66 may inhibit storage in the location identified by the IND MEM ADRS indirect memory address signals.

The transposer module 51 is also used to provide transposed data, originally stored in the memory 42 in slice format, for transmission by the router nodes 45 of the processing elements 41, facilitating the transfer of data, in slice format, between processing nodes 40 over the various communications links interconnecting the router nodes 45 during a message transfer cycle. To accommodate this operation, since the micro-controller 35 enables the processing nodes 40 to transmit and receive contemporaneously, one of the transposers, namely transposer 52($i$), of the transposer module 51 in each processing node 40 will be designated a transmit transposer and be used for transmission, and another transposer, namely transposer 52($j$), will be designated a receive transposer and be used for reception.

The detailed operations by which data slices are transferred between processing nodes 40 will be described in connection with FIGS. 3A and 3B, which contain flow diagrams describing transmission and reception of the data, respectively, and FIGS. 4A and 4B, which contain diagrams illustrating the organization of the data in the transmit transposer 52($i$) and receive transposer 52($j$), respectively. Preliminarily, the transfer of data slices between processing nodes 40 proceeds in four general sequences. First, the micro-controller 35, in a series of iterations, enables the processing nodes 40, in unison, to transfer transmit data pointers from the memory 42 to a third transposer, identified as pointer transposer 52($k$) (steps 101 and 102, FIG. 3A). The transmit data pointers, which are stored in processor format in memory 42, identify slices in memory 12 of the data transfer buffer comprising data to be transferred during a message transfer cycle. In one particular embodiment, each transmit data pointer comprises an offset from the base of the data transfer buffer.

After the transmit data pointers have been loaded into the pointer transposer 52($i$), the micro-controller 35 enables the processing nodes, in unison, to use the transmit data pointers to iteratively identify slices in their respective memories 42 to be loaded into their respective transmit transposers 52($i$) (steps 103 and 104). Thereafter, the micro-controller 35 enables the processing nodes 40 to iteratively transmit, and contemporaneously to receive, the data in the respective transmit transposers 52($i$) over the communications links, and to load the received data into the receive transposers 52($j$) (steps 105 through 107, FIG. 3A, and steps 111 through 114, FIG. 3B). After the receive transposers 52($j$) have been filled, the micro-controller 35, in a series of iterations, enables the processing nodes 40 to transfer the contents of the receive transposers 52($j$) to the transfer data buffer in their respective memories 42 (steps 116 and 117, FIG. 3B). During each message transfer cycle, the data stored in the transfer data buffer is stored in memory 42 at addresses above those used during previous message transfer cycles. This sequence is repeated, through each of the succession of message transfer cycles, until the message transfer operation has been completed.

Figure 3A:
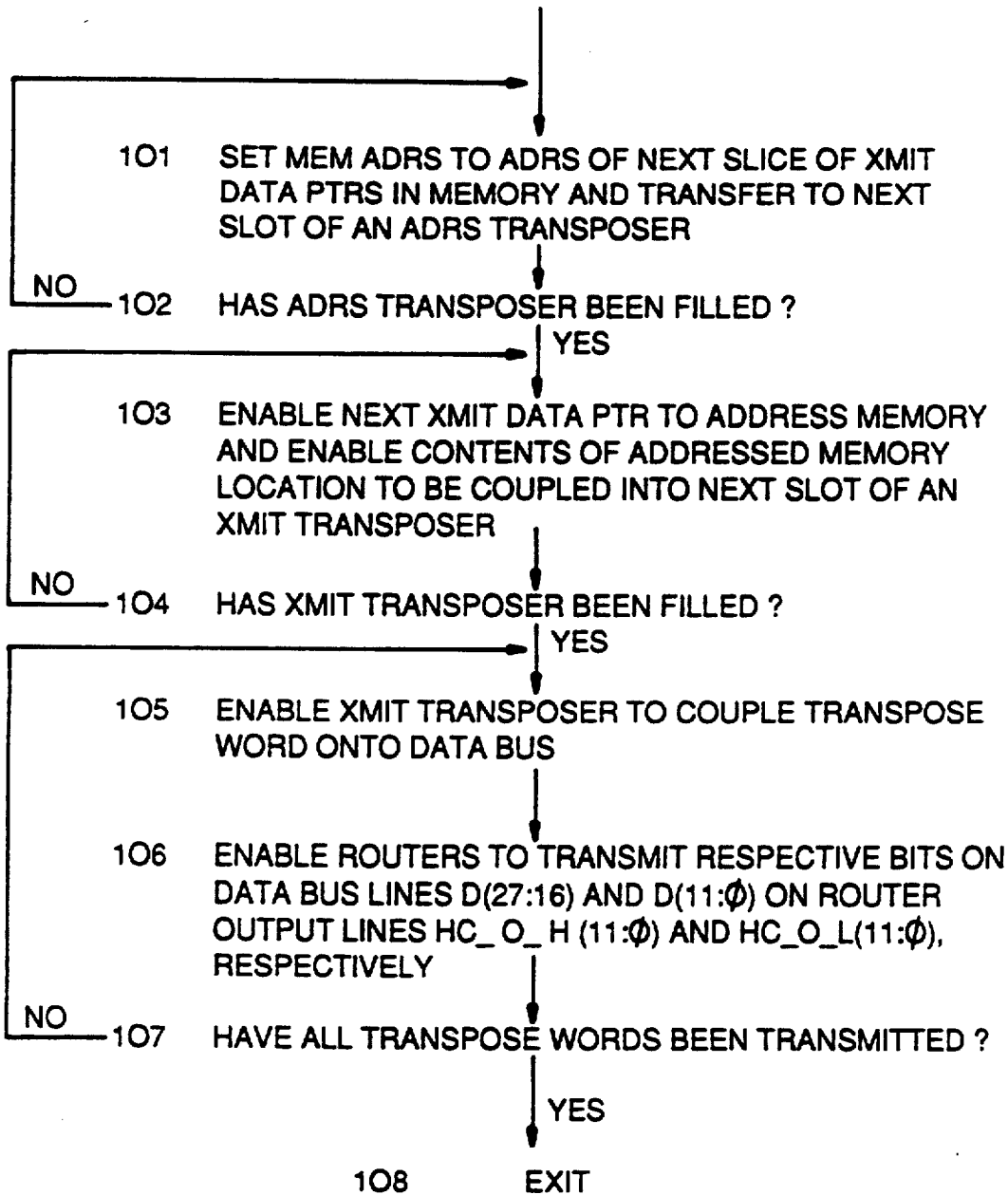
Figure 4A:
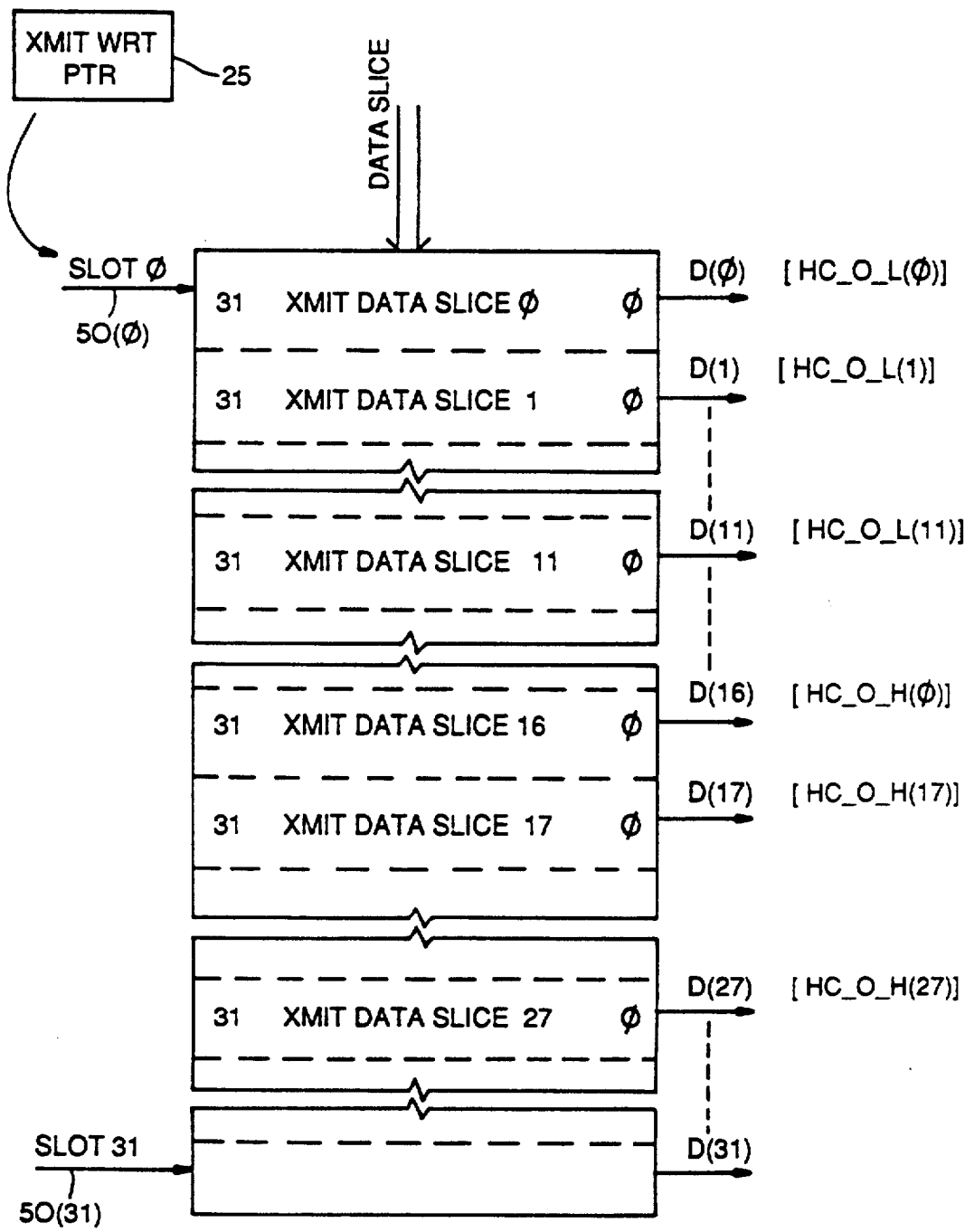

More specifically, with reference to FIGS. 2 and 3A, initially the memory 42 includes a table of transmit data pointers ("XMIT DATA PTRS") and transfer data buffer in which the data slices to be transmitted are stored ("XFER DATA"). The transmit data pointer table contains pointers to locations in the transfer data buffer containing the slices to be stored in successive locations, identified as slots, in the transmit transposer 52($i$) during a message transfer cycle. As will be described below in connection with FIG. 4A, for each message transfer cycle, the order in which the slices from the transfer data buffer are loaded into the slots of the transmit transposer 52(i) effectively determines the particular data line D(i) of bus 43 over which the transmit transposer will couple each data slice, which, in turn, selects the particular communications link HC_O_H(11:0) or HC_O_L(11:0) over which each data slice will be transmitted. Since the communications links are connected to different processor nodes 40 in the array, the transmit data pointers effectively select the processing node 40 to receive each data slice comprising the transmit data transmitted during the message transfer cycle.

As noted above, the micro-controller 35 enables loading of both the pointer transposer 52(k) and the transmit transposer 52(i) in a series of iterations. In loading the pointer transposer 52(k), the micro-controller, during each iteration, generates MC MEM ADRS micro-controller memory address, MEM CTRL memory control and XPOSER CTRL transposer control signals that, in each processing node 40, (1) enables the memory to couple slices from the transmit data pointers onto the data bus 43, and (2) enables the transposer module 51 to load the slice on the data bus 43 into the next slot of the pointer transposer 52(k) (step 101). During each iteration, the MC MEM ADRS micro-controller memory address signals point to a slice in memory 42, and the MEM CTRL memory control signals enable the multiplexer 46 to couple the MC MEM ADRS micro-controller memory address signals as the SEL MEM ADRS selected memory address signals to the memory 42.

In the first iteration, during step 101 the micro-controller 35 generates XPOSER CTRL signals that initialize the pointer register 55(k) associated with the pointer transposer 52(k) to enable the first slice to be loaded into the first slot of the pointer transposer 52(k). In succeeding iterations, the XPOSER CTRL transposer control signals enable the contents of the pointer register 55(k) to be incremented so that successive slices are loaded into the successive slots of the pointer transposer 52(k). Following step 101, the micro-controller 35 determines whether the pointer transposers 52(k) in the processing nodes 40 have been filled (step 102). If not, the micro-controller 35 returns to step 101 to perform another iteration. It will be appreciated that the micro-controller 35 may maintain a counter (not shown) that it increments each time it performs step 101, and use the value of the counter in determining, in step 102, whether the pointer transposers have been filled.

If the micro-controller 35 determines in step 102 that the pointer transposers have been filled, it proceeds to a series of iterations in which it enables, in the processing nodes 40 in parallel, the contents of the respective pointer transposers 52(k) to be used in loading the respective transmit transposers 52(i). Initially, the micro-controller enables the processing nodes 40 to, in parallel, load a pointer to the base of the transfer data buffer in their respective base registers 63. During each iteration, the micro-controller 35 generates MEM CTRL memory control signals and XPOSER CTRL transposer control signals that, in each processing node 40, (1) enables the pointer transposer 52(k) to couple a transpose word, which comprises a transmit data pointer, to an input of adder 63, whose output comprises the IND MEM ADRS indirect memory address signals identifying the location of a slice in the transfer data buffer of the respective memory 42, (2) the multiplexer 46 to couple the IND MEM ADRS indirect memory address signals to the memory 42 as the SEL MEM ADRS selected memory address signals, thereby enabling the memory 42 to couple the data slice identified thereby onto the data bus 43, and (3) enables the transposer module 51 to load the slice on the data bus into the next location of the transmit transposer 52(i) (step 103). After enabling a data slice to be loaded into the transmit transposer 52 (i), the micro-controller determines whether the transmit transposer 52(i) has been filled (step 104), that is, if the transmit transposer 52(i) has a data slice which can be transmitted over each of the communications links HC_O_H(11:0) and HC_O_L(11:0). If not, the micro-controller returns to step 103 to begin another iteration. If the micro-controller 35 determines that the transmit transposer has been filled, it sequences to step 105 to begin transmitting the data therefrom.

In the first iteration, during step 103 the micro-controller 35 generates XPOSER CTRL signals that initialize the pointer register 55(i) associated with the transmit transposer 52(i) to enable the first slice to be loaded into the first slot of the transmit transposer 52(i). In succeeding iterations, the XPOSER CTRL transposer control signals enable the contents of the pointer register 55(i) to be incremented so that successive slices are loaded into the successive slots of the transmit transposer 52(i). It will be appreciated that the micro-controller 35 may maintain a counter (not shown) that it increments each time it performs step 103, and use the value of the counter in determining, in step 104, whether the pointer transposers have been filled.

Before proceeding further, it would be helpful to describe the contents of transmit transposer 52(i) after it has been filled. With reference to FIG. 4A, the transmit transposer includes a series of slots 70(0) through 70(31) [generally identified by reference numeral 70(i)], each of which stores one data slice transmitted thereto over data lines (31:0) comprising data bus 43. The slot 70(i) in which a data slice is stored is identified by the pointer stored in the transmit write pointer register 55(i). As noted above, during each iteration the pointer in register 55(i) is, during step 101, initialized or incremented prior to loading of the slot in step 103.

In one embodiment, the transmit transposer 52(i) is filled when it contains data slices in at most slots 70(0) through 70(11) and slots 70(16) through 70(27). Since each of the router nodes 45L and 45H in each PE chip 41 is connected to twelve output communications links HC_O_L(11:0) and HC_O_H(11:0), in that embodiment data slices from only twenty-four slots, such as slots 70(0) through 70(11) and 70(16) through 70(17), can be transmitted contemporaneously. In that case, the transmit transposer 52(i) contains a data slice to be transmitted over each of the communications links, as shown in FIG. 4A; if data slices are stored in other slots 50(i) they will not be transmitted in that embodiment. It will be appreciated that, depending on the particular computation being performed by the computer system, the transmit transposer 52(i) may be deemed "filled," such that transmission can occur, if fewer than all of the slots 50(0) through 50(11) and 50(16) through 50(27) contain data slices to be transmitted.

Returning to FIG. 3A, after the micro-controller 35 determines that the transmit transposer has been filled, it initiates a series of iterations, each iteration comprising steps 105 through 107, to facilitate transmission of the data from the transmit transposer 52(i) over the communications links. In this operation, the micro-controller iteratively enables the transmission of sequential bits concurrently from all of the data slices stored in the transmit transposer 52(i). That is, during each iteration "i," the micro-controller 35 generates XPOSER CTRL transposer control signals that enable the transmit transposer 52(i) to couple a transmit transpose word through multiplexer 60 onto data bus lines 43 (step 106). The transmit transpose word during iteration "i" comprises the "i-th" bits in all of the slots 50 in the transmit transposer. With reference to FIG. 4A, during each iteration the data bit from slot 50(i) is transmitted onto data line D(i) of the data bus 43.

After data has been transmitted onto the data bus 43, the micro-controller 35 generates RTR CTRL router control signals that enable the router nodes 45H and 45L (FIG. 2) to transmit the bits on lines D(11:0) and D(16:27) onto the communications links HC_O_L(11:0) and HC_O_H(11:0), respectively (step 106). Thereafter, the micro-controller 35 determines whether all of the data has been transmitted from the transmit transposer 52(i) (step 107), and if not, it returns to step 104 to enable transmission of the next transmit transpose word. If, on the other hand, the micro-controller 35 determines in step 107 that all of the data has been transmitted from the transmit transposer, it exits the transmission sequence (step 108).

It will be appreciated that the number of iterations of steps 104 through 107 that are required to transmit the data from the transmit transposer 52(i) corresponds to the number of bits of data in a data slice stored in the transmit transposer 52(i). The maximum number of transmit transpose words that the transmit transposer 52(i) can provide corresponds to the maximum number of bits in a data slice to be transmitted, which is thirty-two in one embodiment. Thus, in determining whether all of the data has been transmitted from the transmit transposer (in connection with step 104) the micro-controller 35 can use an iteration counter to count iterations of steps 104 through 107, and exit when the iteration counter counts to a value corresponding to the number of bits in a data slice, or to a value corresponding to the number of bits to be transmitted if less than all bits are to be transmitted.

The sequence enabled by the micro-controller 35 in connection with reception of the transmitted data will be described in connection with FIGS. 3B and 4B. It will be appreciated that the micro-controller 35 will enable the processing nodes 40 to transmit and receive on an interleaved basis, that is, when the micro-controller 35 enables the router nodes 45H and 45L of the processing nodes 40 to transmit bits of a transpose word onto the communications links HC_O_H(11:0) and HC_O_L(11:0) during one iteration, it also enables the processing nodes 40 to receive the bits from the communications links HC_I_H(11:0) and HC_I_L(11:0) during a contemporaneous iteration of the receive sequence. Thus, at least a portion of the receive sequence depicted on FIG. 3B will occur contemporaneous with the transmission sequence depicted on FIG. 3A.

Figure 3B:
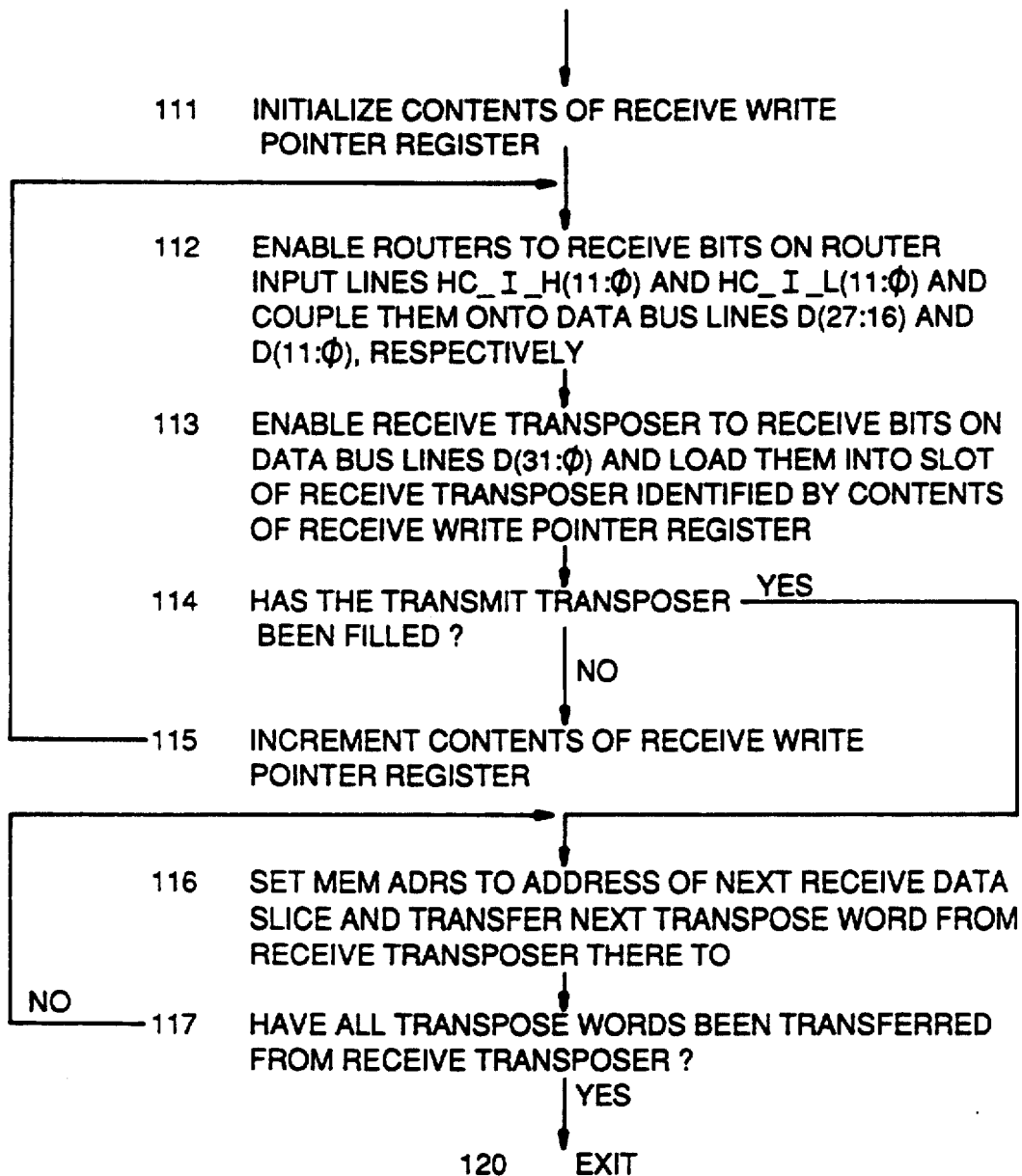

With reference to FIG. 3B, reception by the processing nodes 40 of bits from the communication links proceeds in a series of iterations, comprising steps 112 through 115, each reception iteration occurring after data bits have been coupled onto the communications links during a transmission iteration (steps 105 through 107, FIG. 3A). This allows the processing nodes 40 to receive the bits being transmitted thereto during the transmission iteration. During the successive reception iterations, the processing nodes 40 receive successive bits of the data slices from the other processing nodes connected thereto. In each iteration, each processing node 40 receives bits from corresponding bit locations in the data slices. In the successive iterations, each processing node 40 normally will store the bits in successive slots of the receive transposer 52(j). Thus, initially the micro-controller 35 generates XPOSER CTRL transposer control signals that enable the transposer module 51 in each processing node 40 to initialize its write pointer register 55(j) so as to point to the first slot of the receive transposer 52(j) (step 111).

After initializing the write pointer register 55(j) of each processing nodes 40, the micro-controller 35 initiates the sequential reception iterations, each comprising steps 112 through 115, to load received data into the receive transposer 52(j). During each iteration, the micro-controller 35 generates RTR CTRL router control signals that enable the router nodes 45H and 45L of the processing nodes 40 to receive the data bits then on communications links HC_I_H(11:0) and HC_I_L(11:0) respectively and to couple them onto lines D(27:16) and D(11:0) of the data bus 43 (step 112). Thereafter, the micro-controller 35 generates XPOSER CTRL transposer control signals that enable the multiplexer 54(j) to couple the signals on lines D(31:0) of the data bus 43 to the receive transposer 52(j), and the receive transposer 52(j) to store them in the slot in receive transposer 52(j) (step 113) identified by the contents of the write pointer register 55(j).

Figure 4B:
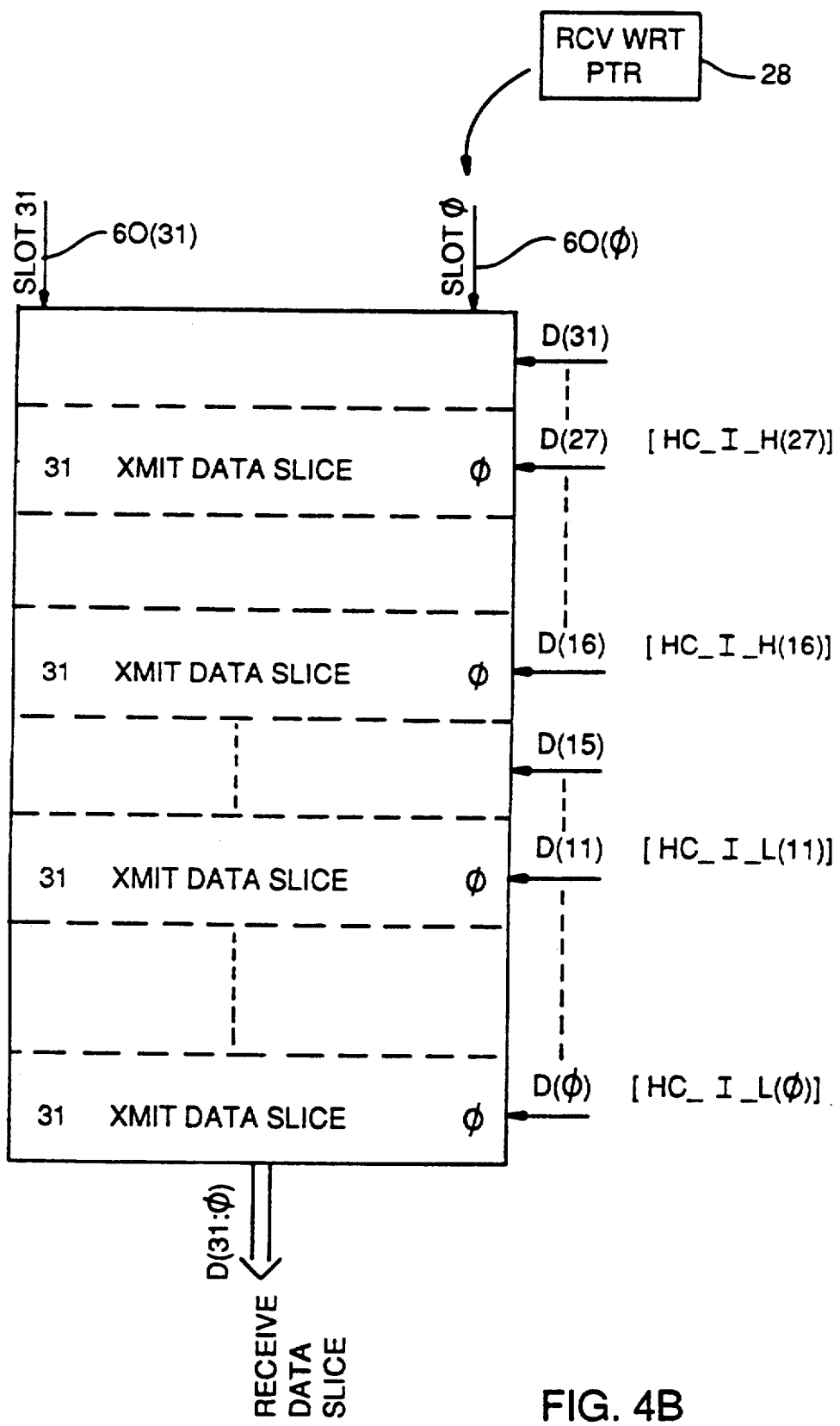

With reference to FIG. 4B, as is the case with transmit transposer 52(i), the receive transposer 52(j) includes a plurality of slots, identified as slot 60(0) through 60(61) [generally identified by reference numeral 60(i)]. Slot 60(i) in the receive transposer 52(j) is loaded with the data bits received during the "i-th" reception iteration. In the successive iterations, bits from each of the communications links HC_I_H(11:0) and HC_I_L(11:0) are coupled to the same bit locations in the successive slots 60. Thus, as shown in FIG. 4B, the data slices from the processing nodes 40 connected thereto are found in the same bit location in the successive slots in the receive transposer 52(j). It will be appreciated that each transpose word provided by the receive transposer 52(j) comprises the bits from the same bit locations in successive slots 60, which, as noted above, corresponds to the successive bits of a data slice transmitted to the processing node 40. Accordingly, the transpose words in the receive transposer, which, as described below, will be stored as data slices in the memory 42 of receiving processing node 40, correspond to the data slices in memory 42 of the processing nodes 40 that transmitted them thereto.

Returning to FIG. 3B, after step 113 the micro-controller 35 then determines whether the receive transposers 52(j) in the processing nodes 40 have been filled (step 114), and, if not, enables the processing nodes 40 to increment the receive write pointer store in their registers 55(j) (step 115). The receive transposer 52(j) will be filled if the number of reception iterations enabled by the micro-controller corresponds to the number of bits in a data slice, or a lesser number if fewer than all bits of the data slices are to be transmitted. If the micro-controller 35 determines that the receive transposers 52(j) have not been filled, it returns to step 112 to initiate another reception iteration.

On the other hand, if the micro-controller 35 determines, in step 114, that the number of reception iterations it has enabled during a message transfer cycle corresponds to the number of data bits in a data slice, it steps to a sequence, comprising steps 116 and 117, in which it enables the processing nodes 43 to transfer the contents of their respective receive transposers 52(j) to their memories 42. In this operation, the micro-controller 35 generates (i) MC MEM ADRS micro-controller memory address signals that identify a location in the receive data region of memory 42, (ii) XPOSER CTRL transposer control signals that enable the receive transposer 52(j) to couple a transpose word through multiplexer 60 onto data bus 43, and (iii) MEM CTRL memory control signals to enable the multiplexer 46 to couple the MC MEM ADRS micro-controller memory address signals to the memory 42 as the SEL MEM ADRS selected memory address signals, and the data represented by the signals on data bus 43 to be stored in memory 42 at the location identified by the SEL MEM ADRS selected memory address signals (step 116). The micro-controller 35 then determines whether it has enabled storage of all of the transpose words from the receive transposer 52(j) in the processing nodes 40 in their respective memories 42 (step 117). If the micro-controller 35 makes a negative determination in step 117, it returns to step 116 to enable storage of the next transpose word from receive transposers 52(j) in respective memories 42. However, if the micro-controller 35 makes a positive determination in step 117, it exits (step 120).

It will be appreciated that the micro-controller 35 can enable the operations described above in connection with FIGS. 3A and 3B to be iteratively performed in a plurality of message transfer cycles, to enable messages to be transferred iteratively relayed through several processing nodes 40 from one originating processing node 40 to a destination processing node for processing.

It will be further appreciated that, while the processing nodes 50 have been described as transferring data in slice format, the data may be originally in processor format and transposed to slice format by the transposer module 51 prior to beginning the transfer. Thus, data processed by the serial processors 44, which is organized in processor format in the memory 42, may be transferred to other processing nodes if the transposer module 51 transposes it to slice format prior to the transfer.

In addition, it will be appreciated that the micro-controller 35 may, while it is enabling the received data to be transferred from the receive transposer 52(j) to the transfer data buffer, enable the use of the transposer module's indirect addressing facility to provide the SEL MEM ADRS selected memory address signals, rather than providing the address signals directly. In that case, the micro-controller 35 may provide the necessary OFFSET signals, which are added to the contents of the base register 62, which, as noted above in connection with the transmission sequence, contains a pointer to the base of the transfer data buffer. Accordingly, the adder 62 will produce IND MEM ADRS indirect memory address signals identifying the location in the transfer data buffer in which the data slice is to be stored. In that case, the micro-controller 35 will also provide MEM CTRL memory control signals that enable the multiplexer 46 to couple the IND MEM ADRS indirect memory address signals to the memory 42 as the SEL MEM ADRS selected memory address signals.

2. Description Of Communication Arrangement Generating System

With this background, the communication arrangement generating system includes a digital computer programmed to operate in two phases. In a first phase, the system generates a mapping of problem vertices 10(i) in a problem graph 5 to processing elements 21(m) in an array 20 comprising a massively parallel processor. As will be described below, during the mapping phase, the system assigns problem vertices 10(i) to the processing elements 21(m) so as to reduce or minimize the number of cycles required to transfer messages among processing elements 21(m) for the problem graph 5, which may increase the rate at which data can be processed for the problem graph 5.

After generating the mapping, the system performs a second, communications link assignment, phase in which it assigns messages to be generated by the problem vertices 10(i) mapped to the processing nodes 40, as well as messages received thereby from other processing nodes 40, to particular communications links 22(n), for the successive message transfer cycles of a message transfer operation. The results of the assignment enable messages to be transferred among the processing nodes 40 as described above in connection with FIGS. 2 through 4B. In the assignment phase, the system generates, for each of the successive message transfer cycles, a table of transmit data pointers which are to be used in performing the message transfers.

Figure 6A:
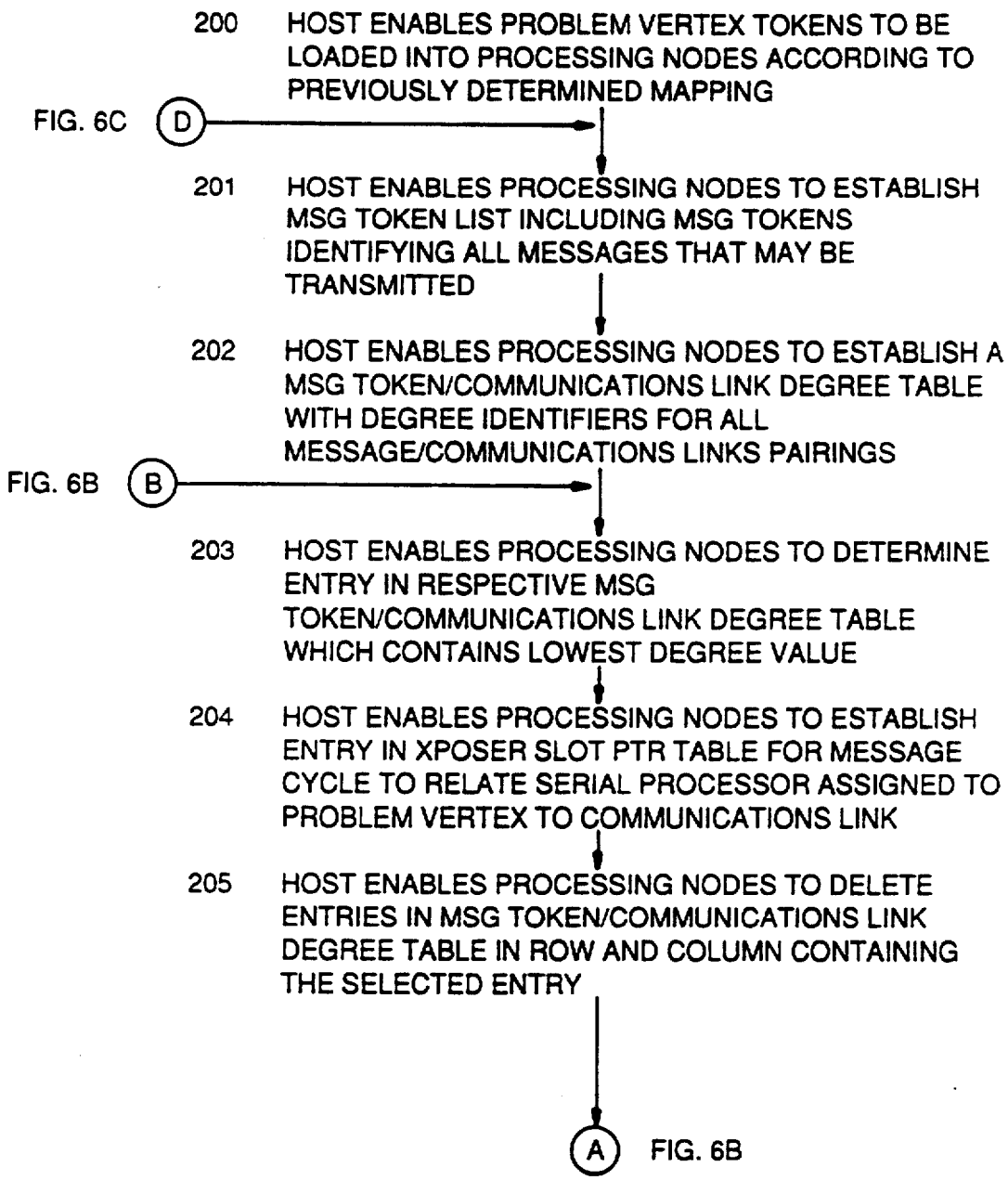
Figure 6B:
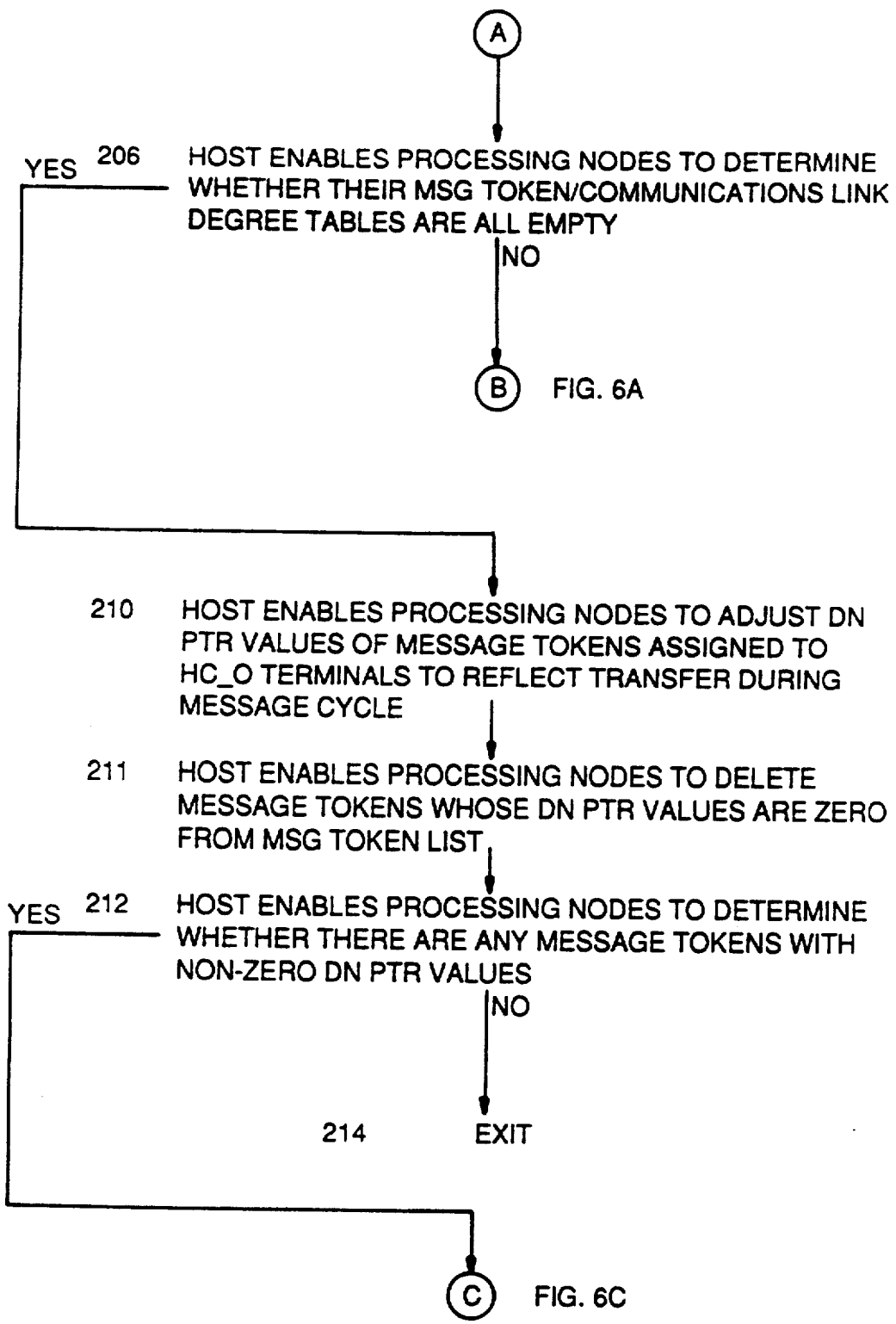
Figure 6C:
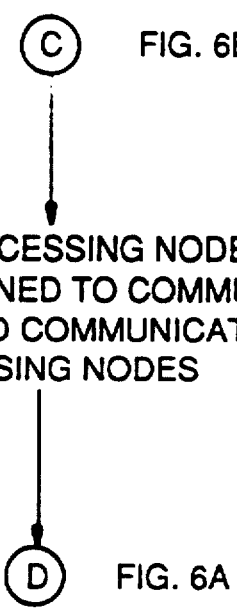
Figure 7A:
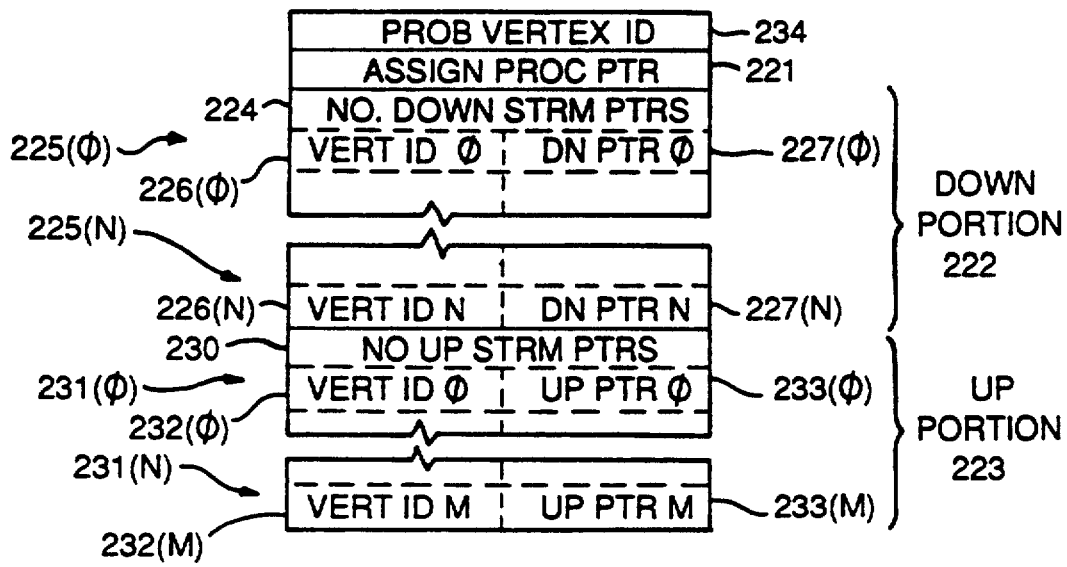
FIGS. 7A, 7B, 7C are diagrams of data structures helpful in understanding the operations described in connection with FIGS. 5A through 6C.
Figure 7B:
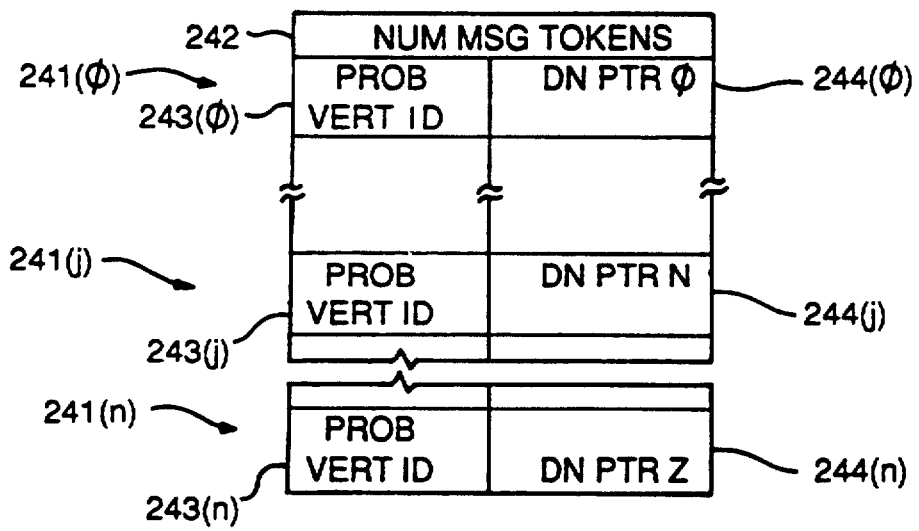
Figure 7C:
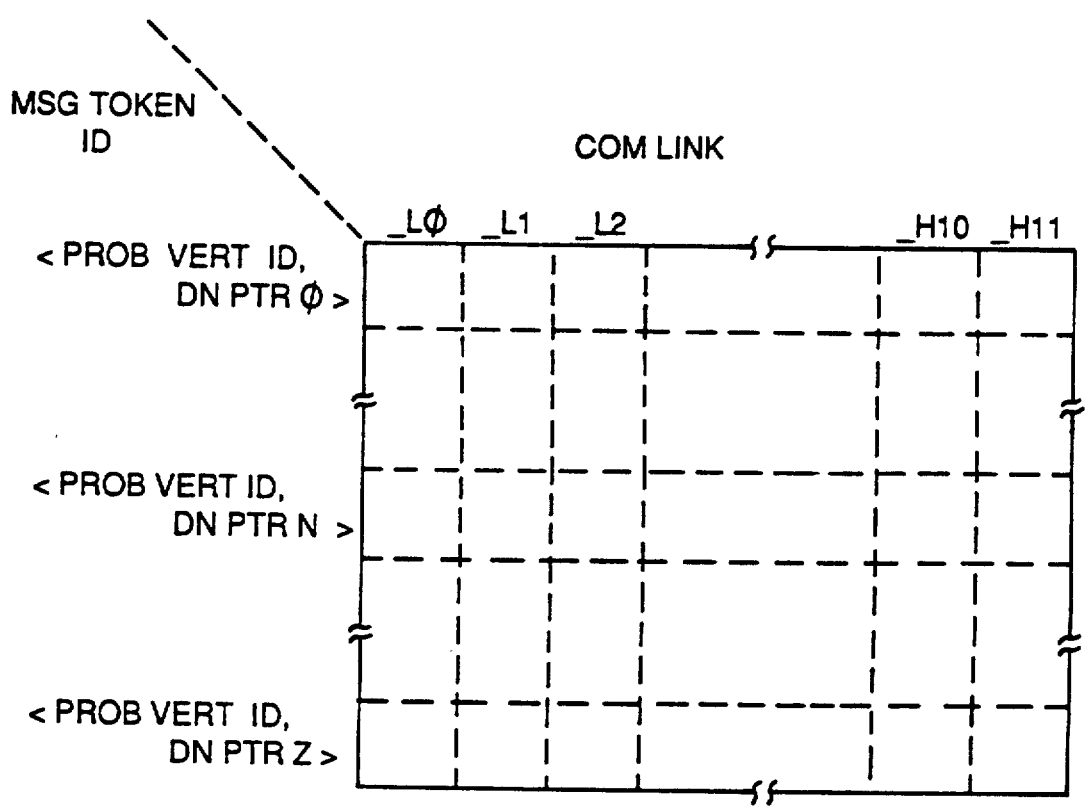

In one particular embodiment, the computer used in the system includes the massively-parallel processor described above in connection with FIG. 2. FIGS. 5A through 5D depict the operations performed during the mapping phase, FIGS. 6A through 6C depict the operations performed in generating the tables of transmit data pointers, and FIGS. 7A through 7C depict data structures that may be used in connection with the system.

A. The Mapping Phase

Generally, in the mapping phase, the system begins with a random mapping, or assignment, of problem vertices 10(i) to processing nodes 40. After the initial assignment, the system generates a communication cost function related to the total number of communication links 22(j) required to transfer messages for all problem vertices 10(i) among the processing nodes 40. Thereafter, the system performs a series of iterations to attempt to determine an improved mapping that generally reduces the communications cost function. In each iteration, the system generates a perturbed mapping, that is, a mapping in which one or more of the problem vertices 10(i) may be assigned to different processing nodes, so as to differ from the mapping of the previous iteration to a predetermined degree. In addition, the system, during each iteration, determines for each reassignment a change in the communication cost function. If the change in the communication cost function for selected reassignments is below a threshold value, the perturbation is permitted, but if the change is above the threshold it is not permitted. In successive iterations, the threshold values are reduced until they reach a value selected according to a termination criterion. The final mapping, which is the mapping determined by the system, is the mapping that exists when the threshold value reaches the termination criterion.

Figure 5A:
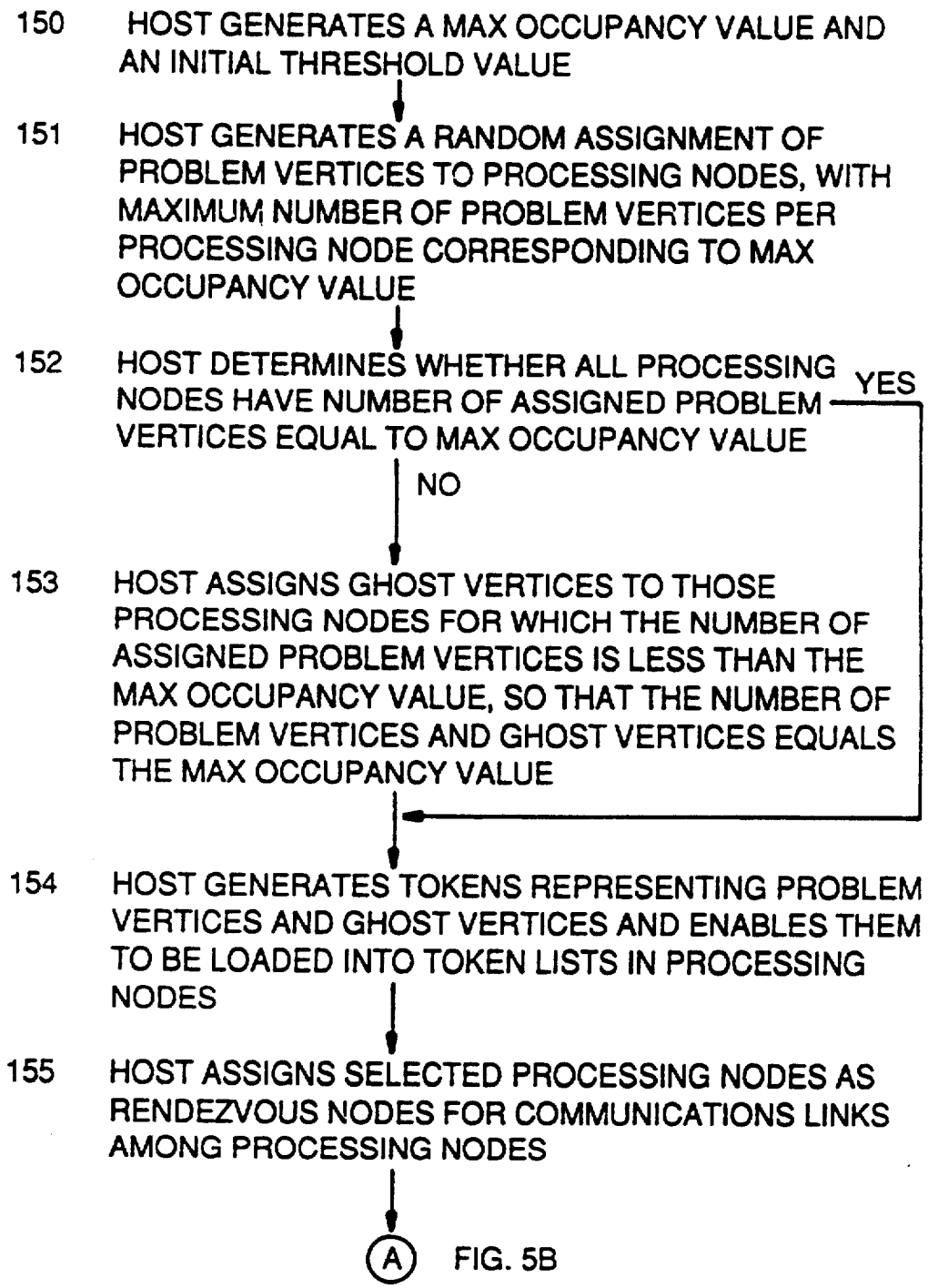
Figures 1, 5D:
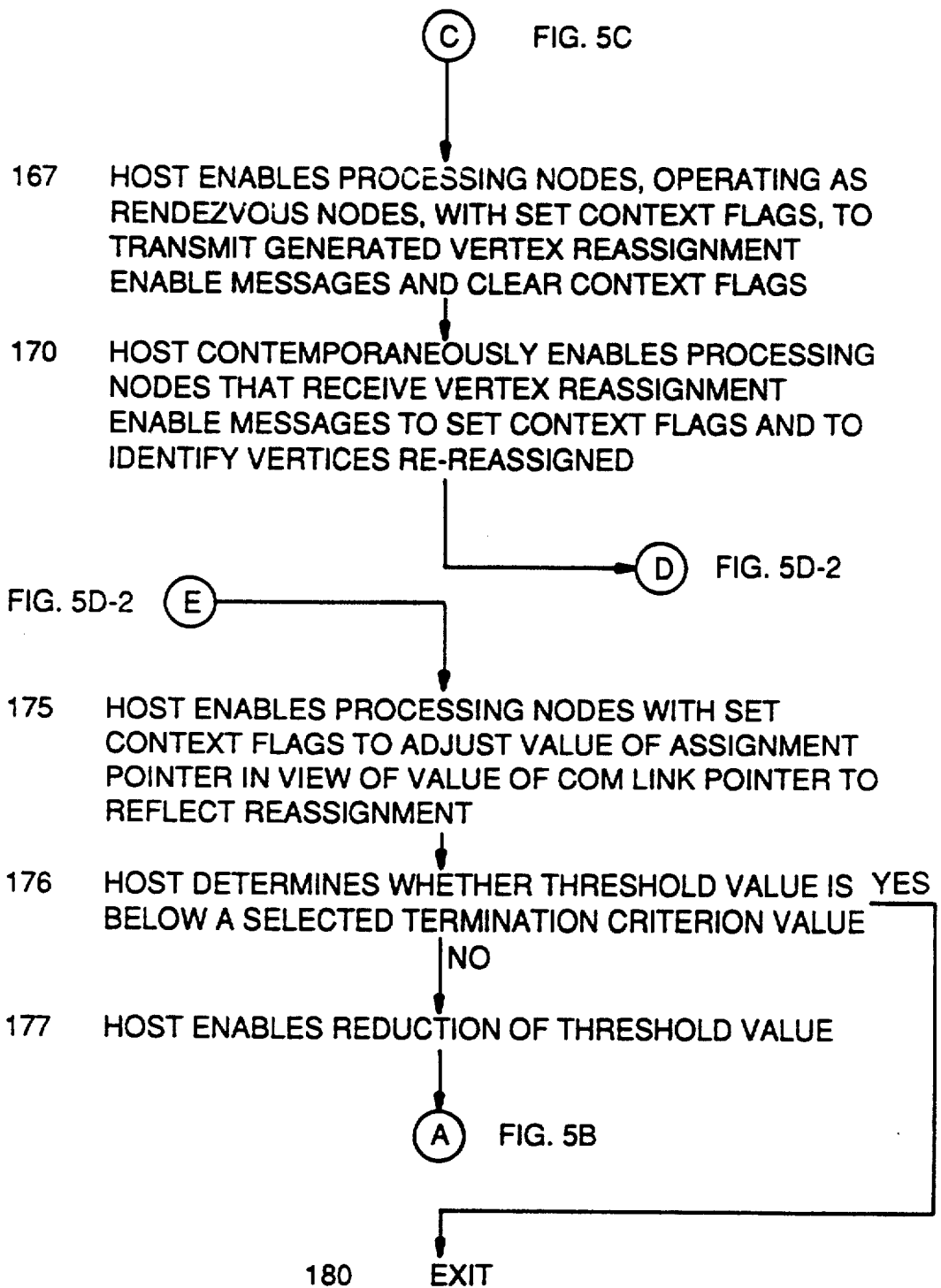

More specifically, with reference to FIG. 5A, the system, in particular the host 36, initially determines a maximum occupancy value and an initial threshold value (step 150). In determining the mapping, the system permits processing nodes 40 to process multiple problem vertices 10(i), but it ensures that the number of problem vertices 10(i) processed by each processing node 40 does not exceed a predetermined maximum occupancy value. The maximum occupancy value may, for example, correspond to the number of serial processors 44 in each processing node 40, in which case each serial processor 44 may be assigned one problem vertex 10(i).

After the host has determined the maximum occupancy value and the initial threshold value, it generates a random mapping, or assignment, of the problem vertices 10(i) to the processing nodes 40 (step 151). In one embodiment, each serial processor 44(i) in the processing array has a unique identifier. In associating the problem vertices 10(i) with the serial processors, each problem vertex 10(i) is given a unique problem vertex identifier, whose value may be randomly selected. The problem vertex identifier serves to identify the processing node 40 with which the problem vertex 10(i) has been associated. The problem vertex identifier may also include a portion to uniquely identify the problem vertex 10(i) among other problem vertices associated with the same processing node 40, which may, in turn, serve to associate the problem vertex 10(i) with a particular serial processor 44(i) in the processing node 40. The random mapping is constrained so that each processing node 40 is assigned at most the number of problem vertices 10(i) corresponding to the maximum occupancy value. The host 36 determines whether the number of problem vertices 10(i) assigned to all of the processing nodes 40 corresponds to the maximum occupancy value (step 152).

For those processing nodes 40 for which the number of problem vertices 10(i) is less than the maximum occupancy value the host generates ghost vertices so that the number of problem vertices 10(i) and the number of ghost vertices for each processing node 40 corresponds to the maximum occupancy value (step 153). As will be made clear below, the ghost vertices are used during subsequent iterations to ensure that the number of problem vertices 10(i) assigned to each processing node 40 does not exceed the maximum occupancy value. At the same time the ghost vertices do not affect the communication cost function, or change therein, determined for each perturbation. On the other hand, if the number of problem vertices 10(i) is so large that the number assigned to any processing node 40 exceeds the maximum occupancy value, the serial processors 14(i) can emulate a plurality of virtual processors as described above, each of which can be assigned a unique identifier, and the problem vertices 10(i) can be assigned to the virtual processors according to their respective identifiers, and ghost vertices can be assigned to any virtual processors without problem vertices assigned thereto.

After the host 36 has assigned problem vertices 10(i) and ghost vertices to each processing node, it generates problem vertex tokens 220 (FIG. 7A) each representing a problem vertex 10(i) or ghost vertex (step 154). The processing nodes 40 use the problem vertex tokens 220 in subsequent processing during the mapping phase. A problem vertex token 220 includes a number of fields to identify the problem vertex 10(i) or ghost vertex represented thereby, problem vertices to which the represented problem vertex 10(i) is directly connected by an edge 11(i) in the problem graph 5, and pointers to the processing nodes 40 in the array 20 to which the connected problem vertices are assigned.

More specifically, with reference to FIG. 7A, a problem vertex token 220 includes an assigned processor pointer field 221, a downstream pointer portion 222 and an upstream pointer portion 223. The assigned processor pointer field 221 contains a pointer to the processing node 40 to which the problem vertex 10(i) is currently assigned. Initially, the contents of the assigned processor pointer field 221 will contain two values, one corresponding to the identification of the problem vertex's assigned processing node 40, and a second value identifying the problem vertex as among other problem vertices assigned to the same processing node 40, with the combination of the values uniquely identifying the problem vertex 10(i) in the problem graph 5. In subsequent iterations, the contents of the assigned processor pointer field 221 may change to reflect the perturbations in the problem vertex assignments as described below. If the problem vertex token 220 represents a ghost vertex, the assigned processor pointer field 221 will also contain a selected value identifying the processing node 40 to which it has been assigned.

The downstream pointer portion 222 and upstream pointer portion 223 contain pointers that point to problem vertex tokens 220 representing problem vertices 10(i) that are downstream and upstream, respectively, in the problem graph 5. It will be appreciated that, if the problem graph 5 is such that messages can be transferred in both directions between problem vertices 10(i) over each edge 11(i), the problem vertex token 220 need only contain one pointer portion.

In any case, the downstream pointer portion 222 contains a length field 222 and a plurality of downstream pointers, generally identified by reference numeral 225(i). The length field 222 identifies the number of downstream pointers 225(i) contained in the downstream portion 222; if the problem graph 5 is such that messages are not transmitted by a problem vertex over any of the edges 11(i) connected thereto, the downstream pointer portion 222 will be empty and the length field 222 will contain the value zero. If the length field 222 does not contain the value zero, the token 220 will have one or more downstream pointers 225(i), each of which includes two fields 226(i) and 227(i). Field 226(i) contains the identifier of a problem vertex that is downstream, in the problem graph 5, of the problem vertex represented by the problem vertex token 220. Field 227(i) includes a pointer, in the array 20, to the processing node 40 to which the problem vertex token 220 for the problem vertex identified in field 226(i) has been assigned. Initially, the contents of field 227(i) points to the processing node 40 with which the problem vertex 10(i) has been assigned, and during subsequent iterations the contents may be modified to reflect assignments of the problem vertex 10(i) to other processing nodes 40.

In one particular embodiment, the communication links 22(m) interconnect the processing nodes 40 in a hypercube. In that embodiment, the pointer in field 227(i) may represent the relative displacement, or address, in the hypercube from the processing node 40 to which the problem vertex 10(i) represented by a particular problem vertex token 220 has been assigned, to the processing node 40 to which the problem vertex identified in field 226(i) has been assigned. That is, pointer in field 227(i) includes a number of digit locations corresponding to the dimensionality of the hypercube, with each digit position in the pointer being associated with one dimension in the hypercube, along with a value identifying the particular serial processor 44(i), or the virtual processor emulated thereby, of the processing node 40 to which the problem vertex 10(i) has been assigned.

In such a pointer, each digit location associated with a hypercube displacement has a value "one" in locations associated with the dimensions in the hypercube to be traversed in going between the processing nodes, and value "zero" otherwise. The number of transfers required over the communications links 22(n) from the processing element 21(n) to which the token's problem vertex 10(i) has been assigned, to the processing element 21(n) to which the problem vertex 10(i) identified by the contents of field 226(i), corresponds to the number of "ones" in the pointer. This corresponds, in turn, to the communication cost of the assignment of the two problem vertices 10(i) to the respective processing nodes 40.

The upstream pointer portion 223 has a length field 230 and upstream pointers 231(i) which are analogous to length field 224 and downstream pointers 225(i) in the downstream pointer portion 222. An upstream pointer 231(i) includes fields 232(i) and 233(i), which are also analogous to fields 226(i) and 227(i) in a downstream pointer 225(i), as described above, with the qualification that the problem vertex identified in field 226(i) is one that is upstream, in the problem graph 5, of the problem vertex 10(i) associated with the problem vertex token 220.

In addition, a problem vertex token 220 may include a problem vertex identification field 234 which identifies the problem vertex 10(i). It will be appreciated that the value contained in the problem vertex identification field 234 will correspond to the identification of the serial processor 44(i), or the particular virtual processor emulated thereby, with which the problem vertex 10(i) has been associated. In addition, the contents of respective fields 226(i) and 232(i) identify the particular serial processors 44(i) to which those problem vertices 10(i) have been associated.

Returning to FIG. 5A, after generating the problem vertex tokens 220, the host 36 enables the array 20 to load them into the processing nodes 40 with which they have been associated (step 154). In this operation, the host 36 enables the problem vertex tokens 220 to be loaded into the memories 42 of the processing nodes 40 in processor format, with the successive bits of a problem vertex token 220 being loaded serially in successive addressable storage locations in the memory 42.

Thereafter, the host assigns a processing node 40 to each communications link 22(m) to operate as a rendezvous node for that communications link 22(m) (step 155). As will be further described below, as the assignments of the problem vertices 10(i) to the processing nodes 40 are perturbed, the processing nodes 40, operating as rendezvous nodes, mediate the perturbations so that the number of problem vertices 10(i) assigned to each processing node does not exceed the maximum occupancy value. More specifically, in the embodiment depicted in FIG. 2, each processing node 40 is connected to twenty four communications links 22(m), with the router nodes 45 of each PE chip 41 being connected to twelve links 22(m). The host 36 identifies twelve serial processors 44 of each processing node 40 to actually perform the mediation operations as described below.

The host 36 then enables the processing nodes 40, in particular the serial processors 44(i), to, in parallel, generate random numbers which are used as communication link pointers for use in a prospective reassignment of the their associated problem vertices 10(i) (step 156). That is, the value of the random number generated by each serial processor 44(i) identifies a communications link 22(m) over which the serial processor's problem vertices 10(i) might be reassigned during the iteration, which would, in turn, result in a reassignment of the problem vertex 10(i) to the new processing node 40.

Each communications link pointer generated in step 156 has a number of digit locations corresponding to the dimensionality of the hypercube in which the communications links 22(m) are connected, with a "one" in one randomly-selected location, and "zeros" elsewhere. The digit location with the "one" identifies the communications link 22(m) assigned in the prospective reassignment. The communications link pointers are used to determine a prospective perturbed mapping of the problem vertices 10(i) to the processing nodes 40.

Whether a problem vertex 10(i) is actually reassigned during the iteration will depend upon subsequent processing during the mapping phase. If a problem vertex 10(i) is reassigned, the values of the digits in the digit locations of the pointers in fields 227(i) and 223(i) in the corresponding problem vertex token 220 corresponding to the digit location of the communications link pointer having the value "one" are complemented. If the complementing results in generation of a "one" in the digit location, the number of communications links 22(n) between processing nodes 40 to which adjacent problem vertices 10(i) are assigned will be increased, with a consequent increase in communication cost. On the other hand, if the complementing results in generation of a "zero" in the digit location, the number of communications links 22(n) between processing nodes 40 to which adjacent problem vertices 10(i) are assigned will be decreased, with a consequent decrease in communication cost.

After enabling generation of the communications link pointers, the host 36, in parallel, enables the processing nodes 40, in particular the serial processors 44, to determine the change in the communication cost which would occur if the problem vertex tokens 220 were actually reassigned over the communications links identified by the pointers generated in step 156 (step 157). Determining the actual change in communication cost would require extensive transfers of information as to the changes regarding the prospective perturbed mapping among the processing nodes 40 to which problem vertices 10(i) directly-connected in the problem graph 5 have been assigned. As a simplification, each processing node 40, under control of the host 36, estimates the change in communication cost by determining the effect only of the reassignment of the problem vertices assigned thereto, using the pointers in the fields 227(i) and 233(i) of the respective problem vertex tokens 220 and the respective communication link pointers generated in step 156.

In performing step 157, the host 36 enables the processing nodes 40, in particular the serial processors 44, to estimate the change in communication cost resulting from a prospective reassignment by determining the number of "zeros" in the pointer fields which would be changed to "ones", and the number of "ones" which would be changed to "zeros", as a result of the prospective reassignment of the problem vertex 10(i) associated with the problem vertex token 220. The number of "zeros" that are changed to "ones" identifies the increase in the communication cost as a result of the prospective reassignment of the problem vertex 10(i), and the number of "ones" changed to "zeros" identifies the decrease in the communication cost.

Since the problem vertex tokens 220 assigned to the various serial processors 44 will have different numbers of pointers 225(i) and 230(i), in this operation the host 36 may enable the processing nodes 40 to use the context flags 49 to disable each serial processor 44 after it has processed all of the pointers in the problem vertex token 220 assigned thereto. It will be appreciated that, since a problem vertex token 220 associated with a ghost vertex has no pointers 225 or 230, the communication cost change value determined therefor will have the value zero.

Thereafter, the host 36 enables the processing nodes 40 to generate and transfer messages to the processing nodes identified as rendezvous nodes for the communications links 22(n) identified by the communications link pointers generated in step 156 (step 160). Each message includes a message identifier, which is associated with a particular prospective reassignment, a source identifier, and a communication cost change value for the reassignment. Upon receipt by the processing nodes 40, the messages from particular communications links 22(n) are loaded, in processor format, into the portions of memory 42 associated with the respective serial processors 44 assigned to the communications links 22(n). If multiple messages are received for a particular communications link 22(n), one message is retained, based on its message identifier. In one particular embodiment, the message identifiers are random number values, and the retained message is that with the whose message identifier has the maximum value.

As noted above, the rendezvous nodes mediate prospective reassignments of problem vertices 10(i) between processing nodes 40 connected to the communications links assigned thereto to ensure that the number of problem vertex tokens, including those associated with problem vertices 10(i) and those associated with ghost vertices, at each processing node 40 does not exceed the maximum occupancy value. Accordingly, after enabling transfer of the messages, the host 36 enables the processing nodes 40, operating as rendezvous nodes, to determine whether they have received messages associated with prospective reassignments from both processing nodes 40 connected to the associated communications links 22(n) (step 161).

That is, during step 161 the host 36 enables, in parallel, those serial processors 44 associated with the communications links 22(n) to search through the messages they have received, stored in their associated locations in memory 42, and determine whether they have received messages from both processing nodes 40 at opposing ends of their associated communications links 22(n). If a serial processor 44 determines that it did receive at least one message from both processing nodes 40 at opposing ends of its associated communications link 22(n), it sets its context flag 49 (FIG. 2). The host 36 thereafter enables the serial processors 44 with set context flags to, in parallel, select at random one of the messages from each of the processing nodes 40 at opposing ends of their assigned communications links 22(n) (step 162).

As noted above, the rendezvous nodes facilitate reassignment of problem vertices 10(i) only if the change in communication cost is less than the predetermined threshold value. To accomplish this, the host enables the processing nodes 40 operating as rendezvous nodes, specifically the serial processors 44 with set context flags 49, to determine a consolidated communication cost change value using the communication cost change value in the respective selected messages (step 163). In step 163, each serial processor 44 whose context flag 49 is set generates the sum of the communication cost change values from the two selected messages. The result provided by each serial processor 44 identifies the change in communication cost which would occur if the prospective reassignment of the problem vertices 10(i) identified in the selected messages actually occurs.

The host 36 then enables the serial processors 44(i) whose context flags 49 are set to generate threshold values and to compare the threshold values to the consolidated communication cost change values determined in step 136 (step 164). Preferably, the threshold during the first iteration is established at a high enough positive value to permit a substantial amount of reassignment of problem vertices 10(i) in early iterations. This is desirable, since the original assignments of problem vertices 10(i) to processing nodes 40 are random. During subsequent iterations, the host 36 adjusts the threshold value, so as to effectively reduce its range.

In one particular embodiment, the threshold values generated by the serial processors 44(i), and the likelihood of having a positive comparison, are related to a "Boltzmann factor" B related to a "temperature value" T provided by the host 36 and the respective consolidated communication cost change value. In particular:

$$B = \exp(-C/T)$$

where "C" is the respective communication cost change value. Each reassignment is accepted or rejected with a probability equal to its Boltzmann factor. The host 36 enables the serial processors 44 which determine that the reassignment will occur to maintain their context flags 49 in the set conditions, and the others to reset their context flags 49 (step 165). The host 36 then enables the serial processors 44 whose context flags 49 are set to generate problem vertex reassignment enabling messages for transfer to the processing nodes 40 connected to their associated communications link 22(n) to identify problem vertex tokens 220 that can be reassigned (step 166). In addition, the host 36 enables the serial processors 44 whose context flags are set to clear them (step 167).

At this point, the processing nodes 40 have received messages from the rendezvous nodes identifying problem vertices 10(i) to be reassigned. In the next several steps 170 through 174 the host enables the processing nodes 40 to update the pointers in respective fields 227(i) the 233(i) in view of the reassignments. In these operations, host 36 enables the processing nodes 40 which receive problem vertex reassignment enabling messages, in particular the processing nodes 40 associated with the problem vertices to be reassigned, to set their context flags 49 (step 170).

The host 36 then enables the processing nodes 40, in particular the serial processors 44(i) with set context flags 49, to generate messages identifying the problem vertices 10(i) to be reassigned and the communication link pointers generated for the reassignment (step 171). Each serial processor 44(i) whose context flag 49 is set generates one message for each pointer 225(i) and 231(i) in the problem vertex token 220 maintained thereby. It will be appreciated that, if a serial processor 44(i) is processing a ghost vertex, it will generate no such messages. The messages will be used to notify the serial processors processing the problem vertices 10(i) listed in the problem vertex token 220 of the reassignment, so that they may adjust their pointers in fields 227(i) or 233(i), respectively.

The host 36 enables the serial processors 44(i), in generating the address portion of each message, to use the contents of the problem vertex identification from a field 226(i) or 232(i) in the problem vertex token. In particular, since, as noted above, the address in the message is a relative displacement, in generating the addresses host 36 enables the serial processors 44(i) to take the bit-wise exclusive-OR of the hypercube portion of its identifier and of the identifier of the serial processor 44(i) as contained in the respective fields 226(i) and 232(i). The host 36 enables the processing nodes 40 to transfer the generated message (step 172).

At each processing node 40 which receives such a message, the message is stored, in processor format, in the portions of the memory 42 associated with the serial processor 44(i) processing the problem vertex token 220 whose pointer is to be adjusted in view of the reassignment. The host 36 then enables the serial processors for which such messages have been received to update the pointers in fields 227(i) and 233(i) in view of the reassignment (step 173). In this operation, the host 36 enables, in parallel, each serial processor 44 for which a message was received to identify the problem vertex pointer 225(i) or 230(i) associated with the problem vertex identified in the message received in step 172. The host 36 then enables each such serial processor to use the communication link pointer received in the message, to complement the bit in the relative address in the respective fields 227(i) or 233(i) of the identified pointer corresponding to the bit of communications link pointer having the value "one". The result of step 173 is, for each message, the update of the value of the relative address in a pointer 225(i) or 230(i) that points to the problem vertex token 220 identified in the message to accommodate the reassignment of the problem vertex 10(i).

In addition, the host 36 enables the serial processors 44(i) associated with reassigned problem vertices 10(i) to update the relative addresses in fields 227(i) and 233(i) of pointers 225(i) and 230(i), respectively, in view of the reassignment (step 174). In this operation, the host 36 enables, in parallel, each serial processor 44 which has a problem vertex 10(i) to be reassigned (that is, those serial processors with set context flags 49) to complement the bits in the bit locations in the relative addresses of fields 227(i) and 233(i) of all of the respective pointers 225(i) and 230(i), corresponding to the bit location in the communications link pointer which has the value "one." The result of step 174 are relative addresses in each problem vertex token 220 updated to accommodate the reassignment of the problem vertex 10(i).

Contemporaneously, the host 36 enables the serial processors 44(i) with set context flags, that is those serial processors 44(i) which have problem vertex tokens 220 for problem vertices 10(i) to be reassigned, to adjust the values of their respective assignment pointers 221 to reflect the reassignment of the problem vertex 10(i) associated with the problem vertex token 220 (step 175). In particular, the serial processors 44(i) with set context flags add the value of the communications link pointers indicating the reassignment to the value of the assignment pointer 221, the result comprising the identifier of the processing node 40 to which the problem vertex is to be assigned.

After enabling adjustment of the various pointers in the respective problem vertex tokens 220 in view of the reassignments, the host 36 determines whether to perform another iteration. In one embodiment, the host 36 makes the determination based on whether the value used by the serial processors 44(i) in generating the threshold values during the iteration in step 164, is below a predetermined termination criterion value (step 176). If not, the host reduces the value (step 177) and returns to step 156 to begin a new iteration. The host 36 iteratively performs steps 157 through 177, reducing the threshold value in step 177 at the end of every iteration, until it reaches an iteration at which the threshold value used during the iteration is below the predetermined termination criterion value, at which the host exits (step 180) the mapping phase.

As suggested above, the threshold values, used in step 165 in determining whether particular problem vertices are to be reassigned, preferably during the first iteration, and more preferably during at least the first few iterations, are relatively large positive numbers. As described above, the threshold values are used to determine whether an exchange of selected problem vertex tokens 220 should be permitted over a communications link 22(n) between processing nodes in view of the sum of the values of the communication cost changes (the aforementioned consolidated communication cost change value) which would occur as a result of the exchange. Accordingly, it might be considered necessary to maintain the threshold value at zero or negative for all iterations, so that a reassignment will only occur if it reduces the sum. However, since the initial mapping of the problem vertex tokens 220 is random (step 151), having the threshold values vary in a decreasing manner from an initial positive value in successive iterations can result in a better final mapping than if the threshold value is maintained at zero or negative.

B. The Communications Link Assignment Phase

As noted above, after generating a mapping of the problem vertices 10(i) to the processing nodes 40, the system performs a phase in which it assigns messages to be generated by the problem vertices 10(i) mapped thereto, as well as messages received, to particular communications links 22(n), for the successive message transfer cycles of a message transfer operation. This is to enable messages to be transferred among the processing nodes 40 as described above in connection with FIGS. 2 through 4B. In the assignment phase, the system generates, in a series of iterations a table of transmit data pointers which are to be used in performing message transfers for each of a succession of message transfer cycles. FIGS. 6A through 6C depict operations performed by the system in the assignment phase.

With reference to FIG. 6A, the host 36 first enables the problem vertex tokens 220 (FIG. 7A) generated during the mapping phase into the processing nodes 40 according to the mapping determined during the mapping phase (step 200). Each problem vertex token 220 includes pointers 225(i) and 230(i) whose relative addresses identify the processing nodes 40 to which the downstream and upstream problem vertices 10(i) have been mapped during the mapping phase. It will be appreciated that, if the system goes directly from the mapping phase to the communications link assignment phase, such that the problem vertex tokens 220 are already loaded into the proper processing nodes 40, the host need not perform step 200.

Thereafter, the host enables the processing nodes 40 to establish a message token list 240 (FIG. 7B) including one or more message tokens generally identified by reference numeral 241(i) (FIG. 7B). The message tokens 241(i) identify all messages that may be generated and transmitted by the respective processing nodes 40 (step 201). At the beginning of the first iteration, during which the transmit data pointers are generated for an initial message transfer cycle, the messages transmitted by a processing node 40 will be those generated during processing of the problem vertices 10(i) assigned thereto. At that point, for each processing node 40, the message token list 240 will have a message token 241(i) for each downstream pointer 225(i) in all of the problem vertex tokens 220 mapped to the processing node 40. During subsequent iterations, during which transmit data pointer tables are generated for subsequent message transfer cycles, the messages transmitted by a processing node 40 may include those received from other processing nodes, and so the message token list 240 will have messages tokens 241(i) for such messages.

Before proceeding further, it would be helpful to describe the structure of the message token list 240. With reference to FIG. 7B, the message token list includes a plurality of message tokens 241(i) and a count field 242 identifying the number of message tokens 241(i) included in the list 240. Each message token includes two fields, including a problem vertex identification field 243(i) and a communications link pointer field 244(i). The contents of a problem vertex identification field 243(i) identify the problem vertex 10(i) comprising the source of the message represented by the message token 241(i). The contents of a communications link pointer field 244(i) identify the relative address, from the processing node 40, to the processing node 40 to which the problem vertex 10(i) has been mapped that is to receive the message represented by the message token 241(i).

The host 36 also enables the processing nodes 40 to establish a table 260 in which it stores information relating the message tokens 241(i) and communications links 22(n) for use in selecting the communications links 22(n) to be assigned to carry a message (step 202). FIG. 7C depicts the structure of a table 260. With reference to FIG. 6C, table 260 includes an array comprising a plurality of entries 261(i)(j) arrayed in rows and columns. The entries 261(i)(j) in each row are associated with one of the message tokens 241(i), and entries 261(i)(j) in each column are associated with a communications link 22(n).

In establishing the table 260, the host 36 enables the processing nodes 40 to load each entry 261(i)(j) in the array with a connectivity degree value identifying the degree of connectivity of the message token 241(i) and communication link 22(n) associated with the array entry 261(i)(j). In one particular embodiment, the connectivity degree value comprises, (a) for each entry 261(i)(j) in a row associated with a message token 241(i) and column associated with a communications link 22(n) over which the associated message may be transmitted, the sum of the number of "ones" in the relative address of the message token 241(i) and the number of message tokens 241(i) which identify the communications link associated with the array entry 261(i)(j), and (b) for all other entries 261(i)(j), zeros.

The number of "ones" in the relative address of the message token 241(i) identifies the number of communications links 22(n) connected to the processing node 40 over which the associated message may be transmitted, and the number of message tokens which identify a communications link 22(n) identifies the number of messages competing for transmission through that communications link during the message transfer cycle. Thus, in that embodiment, the connectivity degree value is thus, generally, a joint measure of (i) the degree of difficulty of assigning a message to a communications link during a message transfer cycle because it may only be transmitted over few communications links and (ii) the likelihood that a communications link will be used during a message transfer cycle. By using the lowest value in the table 260, the system enhances the likelihood of maximizing the number of communications links used during a message transfer cycle.

After establishing the message token list 240 and the table 260, the host performs a series of iterations, each comprising a series of steps 203 through 206, to assign communications links 22(n) to message tokens 241(i) for a message transfer cycle. During each iteration, the host 36 enables the processing nodes 40 to generate an entry in the transmit data pointer table used during the message transfer cycle. In particular, the host enables each processing node 40 to select the array entry 261(i)(j) in the table 260 which has the lowest value (step 203). The host then enables the processing nodes to establish an entry in the transmit data pointer table (FIG. 2) to be used during a message transfer table. The transmit data pointer relates the serial processor 44 to which the problem vertex associated with the array entry 261(i)(j) has been assigned, to the particular communications link 22(n) associated with the array entry 261(i)(j).

Thereafter, the host 36 enables the processing nodes 40 to delete the contents of the array entries 261(i)(j) in the row associated with the just-assigned message token 241(i), and to delete the contents of the array entries 261(i)(j) in the column associated with the just-assigned communications link 22(n) (step 205). The host 36 then enables the processing nodes 40 to determine whether their tables 260 are all empty (step 206). If a processing node 40 has a table 260 which is not empty, the host returns to step 203 to begin another iteration to assign another communications link 22(n) to a message token 241(i).

The host 36 thus enables the processing nodes 40 to perform steps 203 through 206, iteratively generating transmit data pointers in the table for the message transfer cycle, until all of the entries 261(i)(j) in all of their tables 260 are empty, at which point it sequences to step 210. It will be appreciated that the maximum number of communications links 22(n) that can be assigned will be the number of communications links 22(n) connected to a processing node 40. Instead of performing step 206, the host 36 may instead keep a counter (not shown), which it increments and tests at each iteration, sequencing to step 210 when the counter counts to the value corresponding to the number of communications links 22(n) connected to a processing node.

In any case, after sequencing out of the loop comprising steps 203 through 206, the host 36 enables the processing nodes 40 to modify the relative addresses in the message tokens 241(i) associated with the entries 261(i)(j) selected during in step 203 in the successive iterations to accommodate the transfer during the message transfer cycle (step 210). The host 36 then enables the processing nodes 40 to delete from their message token lists 240 any message tokens whose relative addresses in fields 244(i) are all zero (step 211). This deletes any message tokens 241(i) from the message token lists associated with messages that would be delivered to their final destinations during the message transfer cycle.

The host 36 then enables the processing nodes 40 to determine if there are any message tokens 241(i) whose relative addresses are not all zeros (step 212). Such message tokens 241(i) are associated with messages which would not reach their final destination during the message transfer cycle. If so, the host 36 enables the processing nodes to transfer the non-deleted message tokens for messages assigned to communications links 22(n) during the message transfer cycle over the communications links 22(n) to which they have been assigned (step 213), and returns to step 201 to begin processing for a subsequent message transfer cycle. In that processing, the processing nodes 40 include the message tokens 241(i) which they receive in their message token list 240, just as they would message tokens 241(i) associated with messages generated by the problem vertices 10(i) assigned thereto.

It will be appreciated that, at some point in the processing of step 212 all of the processing nodes 40 will determine that the relative addresses in fields 244(i) associated with all remaining message tokens 241(i) have zero values. In that case, all remaining messages will be transferred to their final destinations during the message transfer cycle whose transmit data pointer table was just completed. At that point, the host sequences to step 214 to exit.

C. General

The system enhances processing by massively parallel processors of problems whose communications follow fixed patterns. In particular, the system eliminates the necessity of generating and providing addresses in messages transferred among the processing nodes; the tables of transmit data pointers effectively identify the paths for each message to traverse during subsequent message transfer cycles of a message transfer operation. Thus, the messages effectively require fewer bits, since they do not need to include the addresses and thus can sequence through the routing nodes 15 (FIG. 2) faster. In addition, the circuitry required to interpret the address bits, as described in the aforementioned Hillis patents and Hillis, et al., patent application, need not be used in the message transfer, which can also provide faster message transfer.

As noted above, the system is most useful in connection with processing, on the massively parallel processors described in the aforementioned Hillis patents and Hillis, et al., patent application of problems whose communications follow irregular, but fixed patterns. In the massively-parallel processors described in the Hillis patents and Hillis, et al., patent application, a regular, nearest neighbor communication mechanism is provided which can provide communications in a regular pattern, identified as the "NEWS" communications arrangement. In such processors, the system may not be necessary in connection with problems in which communications follow regular patterns. The system may, however, be used in connection with such processors for regular communications patterns, and will find great utility in connection with such problems in connection with processors that do not have such a communications mechanism.

In addition, while the system has been described as including a computer including a massively-parallel processor array, it will be appreciated that the system may instead include a suitably-programmed serial processor or a multiple-processor computer operating either in parallel or in a non-parallel multi-processor mode of operation.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A system to facilitate the fixed mapping of a problem graph comprising a plurality of problem vertices interconnected by edges which represent the pattern of communication of data between problem vertices in connection with processing of a problem, onto a massively parallel processor comprising a plurality of processing nodes interconnected in a fixed pattern by a plurality of communications links for transferring data among the processing nodes, the system comprising:

A. a mapping element for establishing a fixed mapping of said problem vertices onto said processing nodes in relation to a communication cost function representing time to transfer data among the processing nodes to which the respective problem vertices have been mapped over the communications links as defined by the edges of the problem graph; and B. a communication pattern information generating element for generating communication pattern information in connection with the fixed mapping as determined by the mapping element, for use in directing message transfers among processing nodes to facilitate transfers of messages among the processing nodes over the communications links as defined by the edges of the problem graph.

2. A system as defined in claim 1 in which said mapping element comprises:

A. an initial mapping generator for generating an initial current fixed mapping in which said problem vertices are selectively assigned to said processing nodes;

B. a prospective perturbation generator for generating prospective perturbations in response to the current fixed mapping, each prospective perturbation comprising a prospective reassignment of a problem vertex to another of said processing nodes;

C. a perturbation selector for selecting prospective perturbations generated by said prospective perturbation generator in response to a change in the communication cost function related thereto;

D. a perturbation mapping generator for generating an updated fixed mapping in response to prospective perturbations generated by said prospective perturbation generator as selected by said perturbation selector; and E. a control element for controlling operations by said prospective perturbation generator, the perturbation selector, and the perturbation mapping generator in a plurality of iterations, said prospective perturbation generator and said perturbation selector using the updated fixed mapping generated by said perturbation mapping generator during one iteration as the current fixed mapping during a subsequent iteration.

3. A system as defined in claim 2 in which each prospective perturbation comprises a prospective reassignment of a problem vertex from one of said processing nodes to another of said processing nodes connected directly thereto by a communications link.

4. A system as defined in claim 2 in which:
  A. said control element initially generates a maximum occupancy value,
  B. said initial mapping generator assigns ghost vertices to said processing nodes, such that the number of problem vertices and ghost vertices assigned to a processing node corresponds to said maximum occupancy value.

5. A system as defined in claim 2 in which said perturbation selector includes a plurality of rendezvous nodes each associated with predetermined ones of said processing nodes, each rendezvous node selecting a prospective perturbation generated by said prospective perturbation generator for problem vertices assigned to its associated processing nodes, each rendezvous node determining a change in the communication cost function related thereto related to the prospective perturbation and selectively enabling the prospective perturbation in response thereto.

6. A system as defined in claim 5 in which each prospective perturbation identifies a prospective reassignment of a problem vertex from one processing node over one communications link to an adjacent communications link and in which:
  A. said control element initially generates a maximum occupancy value,
  B. said initial mapping generator assigns ghost vertices to said processing nodes, such that the number of problem vertices and ghost vertices assigned to a processing node corresponds to said maximum occupancy value;
  C. said prospective perturbation generator also generates a prospective perturbed mapping in relation to said ghost vertices; and
  D. each rendezvous node is associated with two processing nodes that are interconnected by a communications link, each rendezvous node selecting the same number of prospective perturbations from its associated processing nodes to maintain the number of problem vertices and ghost vertices assigned to each processing node corresponding to the maximum occupancy value.

7. A system as defined in claim 6 in which each rendezvous node selects one prospective perturbation from each of its associated processing nodes.

8. A system as defined in claim 6 in which each rendezvous node includes:
  A. a prospective perturbation selector for selecting a pair of prospective perturbations, the pair comprising a prospective perturbation from each of its associated processing nodes;
  B. a communication cost change element for determining a communication cost change value in response to the pair of prospective perturbations selected by the prospective perturbation selector.

9. A system as defined in claim 8 in which said control element generates a threshold value, and said rendezvous node further includes a comparator for comparing said communication cost change value generated by the communication cost change element to said threshold value and for enabling the prospective perturbations in response thereto.

10. A system as defined in claim 9 in which the control element generates a new threshold value for each iteration.

11. A system as defined in claim 1 in which said mapping element comprises:
  A. a massively-parallel processor including a plurality of processing nodes interconnected by communications links in a predetermined pattern;
  B. a mapping element control portion comprising:
    i. an initial mapping generator for generating an initial current fixed mapping in which said problem vertices are selectively assigned to said processing nodes, said initial mapping generator generating problem vertex tokens representing said problem vertices and enabling each problem vertex token to be loaded into its assigned processing node;
    ii. a prospective perturbation generator for enabling said processing nodes to generate prospective perturbations in response to the current fixed mapping, each prospective perturbation comprising a prospective reassignment of a problem vertex token to another of said processing nodes;
    iii. a perturbation selector for enabling said processing nodes to select prospective perturbations generated during processing in response to said prospective perturbation generator, in further response to a change in the communication cost function related thereto;
    iv. a perturbation mapping generator for generating an updated fixed mapping in response to prospective perturbations generated by said prospective perturbation generator as selected by said perturbation selector; and
    v. an iteration control element for controlling processing in response to the prospective perturbation generator, the perturbation selector and the perturbation mapping generator in a plurality of iterations, said prospective perturbation generator and said perturbation selector using the updated fixed mapping generated by said perturbation mapping generator during one iteration as the current fixed mapping during a subsequent iteration.

12. A system as defined in claim 11 in which, during processing in response to said perturbation selector, a plurality of processing nodes are enabled to operate as rendezvous nodes, each rendezvous node being associated with predetermined ones of said processing nodes, rendezvous node selecting a prospective perturbation generated during processing in response to the prospective perturbation generator for problem vertices assigned to its associated processing nodes, each rendezvous node determining a change in the communication cost function related thereto related to the prospective perturbation and selectively enabling the prospective perturbation in response thereto.

13. A system as defined in claim 12 in which each prospective perturbation identifies a prospective reassignment of a problem vertex from one processing node over one communications link to an adjacent communications link and in which:
  A. said mapping element control portion initially generates a maximum occupancy value, B. said initial mapping generator further generates ghost vertex tokens and enables them to be loaded into said processing nodes, such that the number of problem vertex tokens and ghost vertex tokens loaded into a processing node corresponds to said maximum occupancy value;

C. said prospective perturbation generator also enables said processing nodes to generate a prospective perturbed mapping in relation to said ghost vertices; and D. each rendezvous node is associated with two processing nodes that are interconnected by a communications link, each rendezvous node selecting the same number of prospective perturbations from its associated processing nodes to maintain the number of problem vertices and ghost vertices assigned to each processing node corresponding to the maximum occupancy value.

14. A system as defined in claim 13 in which each rendezvous node selects one prospective perturbation from each of its associated processing nodes.

15. A system as defined in claim 13 in which the rendezvous nodes operate in response to:

A. a prospective perturbation enabling portion for enabling the processing nodes selected to be rendezvous nodes to select a pair of prospective perturbations, the pair comprising a prospective perturbation from each of its associated processing nodes;

B. a communication cost change enabling portion for enabling the processing nodes selected to be rendezvous nodes to determine a communication cost change value in response to the pair of selected prospective perturbations.

16. A system as defined in claim 15 in which said mapping element control portion generates a threshold value, and said rendezvous nodes further operate in response to a comparator enabling portion for enabling the processing nodes selected to be rendezvous nodes to compare the communication cost change value generated by the communication cost change element to the threshold value and for enabling the prospective perturbations in response thereto.

17. A system as defined in claim 16 in which the mapping element control portion generates a new threshold value for each iteration.

18. A system as defined in claim 1 in which the communication pattern information generating element comprises:

A. a message/communications link correspondence element for generating correspondences to facilitate the transfer of a message over a selected communications link at each processing node; and B. a communication pattern control element for controlling said message/communications link correspondence element in a series of communications link iterations, during each iteration enabling the generation of correspondences for one of a plurality of communications links for a message transfer cycle.

19. A system as defined in claim 18 in which said message/communications link correspondence element includes, for each processing node;

A. a message list including a plurality of entries each associated with a message available for transfer by the processing node during the message transfer cycle;

B. a priority establishment element for generating a priority value associated with each entry in said message list; and C. a communications link assignment element for using the priority values generated by said priority establishment element to associate entries in said message list with communications links connected to said processing node and for generating said communication pattern information in response to the associations.

20. A system as defined in claim 19 in which, at each processing node, each message can be transmitted over selected ones of the communications links connected thereto, said priority establishment element generates a priority value for each entry and communications link in relation to (i) the number of communications links the entry's message can be transmitted over and (ii) the number of messages that can be transmitted through the communications link.

21. A system as defined in claim 20 in which the priority value generated by the priority establishment element corresponds to the sum of (i) the number of communications links the entry's message can be transmitted over and (ii) the number of messages that can be transmitted through the communications link, the communication link assignment element generating communication pattern information for associations of entries and communications links with low priority values.

22. A system as defined in claim 18 in which said communication pattern control element further controls said message/communications link correspondence element in a series of message transfer cycle iterations, each including a plurality of communications link iterations, thereby enabling generation of correspondences for a plurality of message transfer cycles.

23. A system as defined in claim 22 in which said message/communications link correspondence element includes, for each processing node:

A. a message list including a plurality of entries each associated with a message available for transfer by the processing node during the message transfer cycle, including messages determined to be transferred during a previous message transfer cycle;

B. a priority establishment element for generating a priority value associated with each entry in said message list; and C. a communications link assignment element for using the priority values generated by said priority establishment element to associate entries in said message list with communications links connected to said processing node and for generating said communication pattern information in response to the associations.

24. A system as defined in claim 23 in which, at each processing node, each message can be transmitted over selected ones of the communications links connected thereto, said priority establishment element generates a priority value for each entry and communications link in relation to (i) the number of communications links the entry's message can be transmitted over and (ii) the number of messages that can be transmitted through the communications link.

25. A system as defined in claim 24 in which the priority value generated by the priority establishment element corresponds to the sum of (i) the number of communications links the entry's message can be transmitted over and (ii) the number of messages that can be transmitted through the communications link, the communications link assignment element generating communication pattern information for associations of entries and communications links with low priority values.

26. A system as defined in claim 1 in which the communication pattern information generating element comprises:
   A. a massively-parallel processor including a plurality of processing nodes interconnected by communications links in a predetermined pattern;
   B. a communication pattern control portion comprising:
      i. a message/communications link correspondence element for enabling said processing nodes to generate correspondences to facilitate the transfer of a message over a selected communications link at each processing node; and
      ii. a communication pattern control element for enabling said processing nodes to control said processing in response to said message/communications link correspondence element in a series of communications link iterations, during each iteration enabling the generation of correspondences for one of a plurality of communications links for a message transfer cycle.

27. A system as defined in claim 26 in which said message/communications link correspondence element includes:
   A. a message list generating portion for enabling said processing nodes to generate a message list including a plurality of entries each associated with a message available for transfer by the processing node during the message transfer cycle;
   B. a priority establishment element for enabling said processing nodes to generate a priority value associated with each entry in said message list; and
   C. a communications link assignment element enabling said processing nodes to use the priority values generated by said priority establishment element to associate entries in said message list with communications links connected to said processing node and to generate said communication pattern information in response to the associations.

28. A system as defined in claim 27 in which, at each processing node, each message can be transmitted over selected ones of the communications links connected thereto, said priority establishment element enabling said processing nodes to generate a priority value for each entry and communications link in relation to (i) the number of communications links the entry's message can be transmitted over and (ii) the number of messages that can be transmitted through the communications link.

29. A system as defined in claim 28 in which the priority value generated in response to processing controlled by the priority establishment element corresponds to the sum of (i) the number of communications links the entry's message can be transmitted over and (ii) the number of messages that can be transmitted through the communications link, the communications link assignment element enabling said processing node to generate communication pattern information for associations of entries and communications links with low priority values.

30. A system as defined in claim 26 in which processing in response to said communication pattern control element further controls enables said processing nodes to process said message/communications link correspondence element in a series of message transfer cycle iterations, each including a plurality of communications link iterations, thereby enabling generation of correspondences for a plurality of message transfer cycles.

31. A system as defined in claim 30 in which said message/communications link correspondence element includes:
   A. a message list generating portion for enabling said processing nodes to generate a message list including a plurality of entries each including a message token associated with a message available for transfer by the processing node during the message transfer cycle, including message tokens associated with messages determined to be transferred during a previous message transfer cycle;
   B. a priority establishment element for generating a priority value associated with each entry in said message list; and
   C. a communications link assignment element for using the priority values generated by said priority establishment element to associate entries in said message list with communications links connected to said processing node and for generating said communication pattern information in response to the associations.

32. A system as defined in claim 31 in which, at each processing node, each message can be transmitted over selected ones of the communications links connected thereto, said priority establishment element enabling said processing nodes to generate a priority value for each entry and communications link in relation to (i) the number of communications links the entry's message can be transmitted over and (ii) the number of messages that can be transmitted through the communications link.

33. A system as defined in claim 32 in which the priority value generated in response to processing controlled by the priority establishment element corresponds to the sum of (i) the number of communications links the entry's message can be transmitted over and (ii) the number of messages that can be transmitted through the communications link, the communications link assignment element enabling said processing node to generate communication pattern information for associations of entries and communications links with low priority values.

34. A system as defined in claim 31 in which the message/communications link correspondence element further includes a message token transfer element for enabling the processing nodes to transfer of message tokens over the communications links associated therewith after associations have been generated for a message transfer cycle.

35. A system as defined in claim 34 in which each message token has a destination pointer, said message token transfer element enabling the processing nodes to adjust the values of the pointers in relation to the communications link over which it transfers the message token.

36. A system to facilitate the fixed mapping of a problem graph comprising a plurality of problem vertices interconnected by edges which represent a data communication pattern among the problem vertices in connection with processing of a problem, onto a massively parallel processor comprising a plurality of processing nodes interconnected by a plurality of communications links for transferring data among the processing nodes, the mapping being in relation to a communication cost function representing time to transfer data among the processing nodes to which the respective problem vertices have been mapped, the system comprising:
- A. an initial mapping generator for generating an initial current fixed mapping in which said problem vertices are selectively assigned to said processing nodes;
- B. a prospective perturbation generator for generating prospective perturbations in response to the current mapping, each prospective perturbation comprising a prospective reassignment of a problem vertex to another of said processing nodes;
- C. a perturbation selector for selecting prospective perturbations generated by said prospective perturbation generator in response to a change in the communication cost function related thereto;
- D. a perturbation mapping generator for generating an updated fixed mapping in response to prospective perturbations generated by said prospective perturbation generator as selected by said perturbation selector; and
- E. a control element for controlling operations by said prospective perturbation generator, the perturbation selector and the perturbation mapping generator in a plurality of iterations, said prospective perturbation generator and said perturbation selector using the updated fixed mapping generated by said perturbation mapping generator during one iteration as the current fixed mapping during a subsequent iteration.

37. A system as defined in claim 36 in which each prospective perturbation comprises a prospective reassignment of a problem vertex from one of said processing nodes to another of said processing nodes connected directly thereto by a communications link.

38. A system as defined in claim 36 in which:
- A. said control element initially generates a maximum occupancy value,
- B. said initial mapping generator assigns ghost vertices to said processing nodes, such that the number of problem vertices and ghost vertices assigned to a processing node corresponds to said maximum occupancy value.

39. A system as defined in claim 36 in which said perturbation selector includes a plurality of rendezvous nodes each associated with predetermined ones of said processing nodes, each rendezvous node selecting a prospective perturbation generated by said prospective perturbation generator for problem vertices assigned to its associated processing nodes, each rendezvous node determining a change in the communication cost function related thereto related to the prospective perturbation and selectively enabling the prospective perturbation in response thereto.

40. A system as defined in claim 39 in which each prospective perturbation identifies a prospective reassignment of a problem vertex from one processing node over one communications link to an adjacent communications link and in which:
- A. said control element initially generates a maximum occupancy value,
- B. said initial mapping generator assigns ghost vertices to said processing nodes, such that the number of problem vertices and ghost vertices assigned to a processing node corresponds to said maximum occupancy value;
- C. said prospective perturbation generator also generates a prospective perturbed mapping in relation to said ghost vertices; and
- D. each rendezvous node is associated with two processing nodes that are interconnected by a communications link, each rendezvous node selecting the same number of prospective perturbations from its associated processing nodes to maintain the number of problem vertices and ghost vertices assigned to each processing node corresponding to the maximum occupancy value.

41. A system as defined in claim 40 in which each rendezvous node selects one prospective perturbation from each of its associated processing nodes.

42. A system as defined in claim 40 in which each rendezvous node includes:
- A. a prospective perturbation selector for selecting a pair of prospective perturbations, the pair comprising a prospective perturbation from each of its associated processing nodes;
- B. a communication cost change element for determining a communication cost change value in response to the pair of prospective perturbations selected by the prospective perturbation selector.

43. A system as defined in claim 42 in which said control element generates a threshold value, and said rendezvous node further includes a comparator for comparing said communication cost change value generated by the communication cost change element to said threshold value and for enabling the prospective perturbations in response thereto.

44. A system as defined in claim 43 in which the control element generates a new threshold value for each iteration.

45. A system to facilitate the fixed mapping of a problem graph comprising a plurality of problem vertices interconnected by edges which represent the pattern of communication of data between problem vertices in connection with processing of a problem, onto a problem massively parallel processor comprising a plurality of problem processing nodes interconnected by a plurality of problem communications links for transferring data among the problem processing nodes, the mapping being in relation to a communication cost function representing time to transfer data among the problem processing nodes to which the respective problem vertices have been mapped, the system comprising:
- A. mapping massively-parallel processor including a plurality of mapping processing nodes interconnected by mapping communications links;
- B. a mapping element control portion comprising:
  - i. an initial mapping generator for generating an initial current fixed mapping in which said problem vertices are selectively assigned to said problem processing nodes, said initial mapping generator generating problem vertex tokens representing said problem vertices and enabling each problem vertex token to be loaded into its assigned mapping processing node;
  - ii. a prospective perturbation generator for enabling said mapping processing nodes to generate prospective perturbations in response to the current mapping, each prospective perturbation comprising a prospective reassignment of a problem vertex to another of said problem processing nodes;
  - iii. a perturbation selector for enabling said mapping processing nodes to select prospective perturbations generated during processing in response to said prospective perturbation generator, in further response to a change in the communication cost function related thereto; and iv. a perturbation mapping generator for enabling said mapping processing nodes to generate an updated fixed mapping in response to prospective perturbations generated by said mapping processing nodes during processing in response to said prospective perturbation generator and said perturbation selector v. an iteration control element for controlling processing by said mapping processing nodes in response to the prospective perturbation generator, the perturbation selector and the perturbation mapping generator in a plurality of iterations, said mapping processing nodes, during processing in response to said prospective perturbation generator and said perturbation selector during in one iteration using as the current fixed mapping, the updated fixed mapping generated during processing in response to the perturbation mapping generator during a previous iteration.

46. A system as defined in claim 45 in which, during processing in response to said perturbation selector, a plurality of mapping processing nodes are enabled to operate as rendezvous nodes, each rendezvous node being associated with predetermined ones of said mapping processing nodes, said rendezvous nodes selecting a prospective perturbation generated during processing in response to the prospective perturbation generator for problem vertices assigned to its associated processing nodes, each rendezvous node determining a change in the communication cost function related thereto related to the prospective perturbation and selectively enabling the prospective perturbation in response thereto.

47. A system as defined in claim 46 in which each prospective perturbation identifies a prospective reassignment of a problem vertex from one processing node over one communications link to an adjacent communications link and in which:

A. said mapping element control portion includes a maximum occupancy value generator that generates a maximum occupancy value.

B. said initial mapping generator further generates ghost vertex tokens and enables them to be loaded into said mapping processing nodes, such that the number of problem vertex tokens and ghost vertex tokens loaded into a processing node corresponds to said maximum occupancy value;

C. said prospective perturbation generator also enables said mapping processing nodes to generate a prospective perturbed mapping in relation to said ghost vertex tokens; and D. each rendezvous node is associated with two mapping processing nodes that are interconnected by a communications link, each rendezvous node selecting the same number of prospective perturbations from its associated processing nodes to maintain the number of problem vertices and ghost vertices assigned to each processing node corresponding to the maximum occupancy value.

48. A system as defined in claim 47 in which each rendezvous node selects one prospective perturbation from each of its associated mapping processing nodes.

49. A system as defined in claim 47 in which the rendezvous nodes operate in response to:

A. a prospective perturbation enabling portion for enabling the mapping processing nodes which are selected to be rendezvous nodes to select a pair of prospective perturbations, the pair comprising a prospective perturbation from each of its associated mapping processing nodes;

B. a communication cost change enabling portion for enabling the mapping processing nodes selected to be rendezvous nodes to determine a communication cost change value in response to the pair of selected prospective perturbations.

50. A system as defined in claim 49 in which said mapping element control portion includes a threshold value generating portion that generates a threshold value, and said rendezvous nodes further operate in response to a comparator enabling portion for enabling the processing nodes which are selected to be rendezvous nodes to compare the communication cost change value generated by the communication cost change element to the threshold value and for enabling the prospective perturbations in response thereto.

51. A system as defined in claim 50 in which the threshold value generating portion generates a new threshold value for each iteration.

52. A system for generating communication pattern information to direct message transfers in a predetermined pattern among processing nodes interconnected over communications links to form a massively parallel processor, to in turn facilitate communication among problem vertices mapped onto the processing nodes in a fixed pattern as defined by a problem graph, the system comprising:

A. a message/communications link correspondence element for generating for each processing node fixed correspondences to facilitate the transfer of a message over a selected communications link at each processing node; and B. a communication pattern control element for controlling said message/communications link correspondence element in a series of communications link iterations, during each iteration enabling the generation of correspondences for one of a plurality of communications links for a message transfer cycle.

53. A system as defined in claim 52 in which said message/communications link correspondence element includes, for each processing node:

A. a message list including a plurality of entries each associated with a message available for transfer by the processing node during the message transfer cycle;

B. a priority establishment element for generating a priority value associated with each entry in said message list; and C. a communications link assignment element for using the priority values generated by said priority establishment element to associate entries in said message list with communications links connected to said processing node and for generating said communication pattern information in response to the associations.

54. A system as defined in claim 53 in which, at each processing node, each message can be transmitted over selected ones of the communications links connected thereto, said priority establishment element generates a priority value for each entry and communications link in relation to (i) the number of communications links the entry's message can be transmitted over and (ii) the number of messages that can be transmitted through the communications link.

55. A system as defined in claim 54 in which the priority value generated by the priority establishment element corresponds to the sum of (i) the number of communications links the entry's message can be transmitted over and (ii) the number of messages that can be transmitted through the communications link, the communications link assignment element generating communication pattern information for associations of entries and communications links with low priority values.

56. A system as defined in claim 52 in which said communication pattern control element further controls said message/communications link correspondence element in a series of message transfer cycle iterations, each including a plurality of communications link iterations, thereby enabling generation of correspondences for a plurality of message transfer cycles.

57. A system as defined in claim 56 in which said message/communications link correspondence element includes, for each processing node:
 A. a message list including a plurality of entries each associated with a message available for transfer by the processing node during the message transfer cycle, including messages determined to be transferred during a previous message transfer cycle;
 B. a priority establishment element for generating a priority value associated with each entry in said message list; and
 C. a communications link assignment element for using the priority values generated by said priority establishment element to associate entries in said message list with communications links connected to said processing node and for generating said communication pattern information in response to the associations.

58. A system as defined in claim 57 in which, at each processing node, each message can be transmitted over selected ones of the communications links connected thereto, said priority establishment element generates a priority value for each entry and communications link in relation to (i) the number of communications links the entry's message can be transmitted over and (ii) the number of messages that can be transmitted through the communications link.

59. A system as defined in claim 58 in which the priority value generated by the priority establishment element corresponds to the sum of (i) the number of communications links the entry's message can be transmitted over and (ii) the number of messages that can be transmitted through the communications link, the communications link assignment element generating communication pattern information for associations of entries and communications links with low priority values.

60. A system for generating communication pattern information to direct message transfers in a predetermined pattern among problem processing nodes interconnected over problem communications links to form a problem massively parallel processor, to in turn facilitate communication among problem vertices mapped onto the processing nodes in a fixed pattern as defined by a problem graph, the system comprising:
 A. a mapping massively-parallel processor including a plurality of mapping processing nodes interconnected by mapping communications links in a predetermined pattern;
 B. a communication pattern control portion comprising:
  i. a message/communications link correspondence element for enabling said mapping processing nodes to generate for each processing node fixed correspondences to facilitate the transfer of a message over a selected communications link at each problem processing node; and
  ii. a communication pattern control element for enabling said mapping processing nodes to control said processing in response to said message/communications link correspondence element in a series of communications link iterations, during each iteration enabling the generation of correspondences for one of a plurality of problem communications links for a message transfer cycle.

61. A system as defined in claim 60 in which said message/communications link correspondence element includes:
 A. a message list generating portion for enabling said mapping processing nodes to generate a message list including a plurality of entries each associated with a message available for transfer by the problem processing node during the message transfer cycle;
 B. a priority establishment element for enabling said mapping processing nodes to generate a priority value associated with each entry in said message list; and
 C. a communications link assignment element enabling said mapping processing nodes to use the priority values generated by said priority establishment element to associate entries in said message list with communications links connected to said respective problem processing nodes and to generate said communication pattern information in response to the associations.

62. A system as defined in claim 61 in which, at each problem processing node, each message can be transmitted over selected ones of the problem communications links connected thereto, said priority establishment element enabling said mapping processing nodes to generate a priority value for each entry and communications link in relation to (i) the number of problem communications links the entry's message can be transmitted over and (ii) the number of messages that can be transmitted through the problem communications link.

63. A system as defined in claim 62 in which the priority value generated in response to processing controlled by the priority establishment element corresponds to the sum of (i) the number of problem communications links the entry's message can be transmitted over and (ii) the number of messages that can be transmitted through the communications link, the communications link assignment element enabling said mapping processing nodes to generate communication pattern information for associations of entries and problem communications links with low priority values.

64. A system as defined in claim 60 in which processing in response to said communication pattern control element further enables said mapping processing nodes to process said message/communications link correspondence element in a series of message transfer cycle iterations, each including a plurality of communications link iterations, thereby enabling generation of correspondences for a plurality of message transfer cycles.

65. A system as defined in claim 64 in which said message/communications link correspondence element includes:
  A. a message list generating portion for enabling said mapping processing nodes to generate a message list including a plurality of entries each including a message token associated with a message available for transfer by the problem processing node during the message transfer cycle, including message tokens associated with messages determined to be transferred during a previous message transfer cycle;
  B. a priority establishment element for enabling said mapping processing nodes to generate a priority value associated with each entry in said message list; and
  C. a communications link assignment element for enabling said mapping processing nodes to use the priority values generated by said priority establishment element to associate entries in said message list with communications links connected to said mapping processing node and for generating said communication pattern information in response to the associations.

66. A system as defined in claim 65 in which, at each problem processing node, each message can be transmitted over selected ones of the problem communications links connected thereto, said priority establishment element enabling said mapping processing nodes to generate a priority value for each entry and problem communications link in relation to (i) the number of problem communications links the entry's message can be transmitted over and (ii) the number of messages that can be transmitted through the problem communications link.

67. A system as defined in claim 66 in which the priority value generated in response to processing controlled by the priority establishment element corresponds to the sum of (i) the number of problem communications links the entry's message can be transmitted over and (ii) the number of messages that can be transmitted through the problem communications link, the communications link assignment element enabling said mapping processing node to generate communication pattern information for associations of entries and problem communications links with low priority values.

68. A system as defined in claim 65 in which the message/communications link correspondence element further includes a message token transfer element for enabling the mapping processing nodes to transfer of message tokens over the mapping communications links associated therewith after associations have been generated for a message transfer cycle.

69. A system as defined in claim 68 in which each message token has a destination pointer, said message token transfer element enabling the mapping processing nodes to adjust the values of the pointers in relation to the mapping communications link over which it transfers the message token.

70. A method of establishing a fixed mapping a problem graph comprising a plurality of problem vertices interconnected by edges which represent the pattern of communication of data between problem vertices in connection with processing of a problem, onto a massively parallel processor comprising a plurality of processing nodes interconnected in a fixed pattern by a plurality of communications links for transferring data among the processing nodes, the method comprising the steps of:
  A. establishing a fixed mapping of said problem vertices onto said processing nodes in relation to a communication cost function representing time to transfer data among the processing nodes to which the respective problem vertices have been mapped over the communications links as defined by the edges of the problem graph; and
  B. generating communication pattern information in connection with the established fixed mapping for use in directing message transfers among processing nodes to facilitate transfers of messages among the processing nodes over the communications links as defined by the edges of the problem graph.

71. A method of establishing a fixed mapping of a problem graph comprising a plurality of problem vertices interconnected by edges which represent a data communication pattern among the problem vertices in connection with processing of a problem, onto a massively parallel processor comprising a plurality of processing nodes interconnected by a plurality of communications links for transferring data among the processing nodes, the fixed mapping being in relation to a communication cost function representing time to transfer data among the processing nodes to which the respective problem vertices have been mapped, the method comprising the steps of:
  A. generating an initial current fixed mapping in which said problem vertices are selectively assigned to said processing nodes; and
  B. iteratively:
    (i) generating prospective perturbations in response to the current fixed mapping, each prospective perturbation comprising a prospective reassignment of a problem vertex to another of said processing nodes; and
    (ii) selecting prospective perturbations in response to a change in the communication cost function related thereto, the ones of the prospective perturbations selected during an iteration effecting an actual reassignment of problem vertices to provide a new current fixed mapping for use as the current fixed mapping in a subsequent iteration.

72. For use in connection with a computer to facilitate the fixed mapping of a problem graph comprising a plurality of problem vertices interconnected by edges which represent the pattern of communication of data between problem vertices in connection with processing of a problem, onto a massively parallel processor comprising a plurality of processing nodes interconnected by a plurality of communications links for transferring data among the processing nodes, the mapping being in relation to a communication cost function representing time to transfer data among the processing nodes to which the respective problem vertices have been mapped, a mapping element control element for controlling said computer comprising:
  A. an initial mapping generator element for enabling said computer to generate an initial current fixed mapping in which said problem vertices are selectively assigned to said processing nodes;
  B. a prospective perturbation generator element for enabling said computer to generate prospective perturbations in response to the current mapping, each prospective perturbation comprising a prospective reassignment of a problem vertex to another of said processing nodes;

C. a perturbation selector element for enabling said computer to select prospective perturbations generated during processing in response to said prospective perturbation generator, in further response to a change in the communication cost function related thereto;

D. a perturbation mapping generator element for enabling said computer to generate an updated fixed mapping in response to prospective perturbations generated and selected by said computer during processing in response to said prospective perturbation generator element and said perturbation selector element; and E. an iteration control element for controlling processing by said computer in response to the prospective perturbation generator element, the perturbation selector element and the perturbation mapping generator element in a plurality of iterations, the computer, during processing in response to said prospective perturbation generator element and said perturbation selector element, using as the current fixed mapping, the updated fixed mapping generated during processing in response to said perturbation mapping generator element during a previous iteration.

73. For use in connection with a computer to generate communication pattern information to direct message transfers in a predetermined pattern among processing nodes interconnected over communications links to form a massively parallel processor, to in turn facilitate communication among problem vertices mapped onto the processing nodes in a fixed pattern as defined by a problem graph, a communication pattern control element comprising:

A. message/communications link correspondence element for enabling said computer to generate fixed correspondences to facilitate the transfer of a message over a selected communications link at each processing node; and B. a communication pattern control element for controlling processing by said computer in connection with said message/communications link correspondence element in a series of communications link iterations, during each iteration enabling the generation of correspondences for one of a plurality of communications links for a message transfer cycle.

* * * * *